United States Patent
Purcaro

(10) Patent No.: US 9,259,041 B1
(45) Date of Patent: Feb. 16, 2016

(54) BATH TOWEL BIB WITH BUILT-IN TOTE BAG

(71) Applicant: Mary Kenney Purcaro, West Palm Beach, FL (US)

(72) Inventor: Mary Kenney Purcaro, West Palm Beach, FL (US)

( * ) Notice: Subject to any disclaimer, the term of this patent is extended or adjusted under 35 U.S.C. 154(b) by 460 days.

(21) Appl. No.: 13/674,851

(22) Filed: Nov. 12, 2012

Related U.S. Application Data

(63) Continuation-in-part of application No. 12/639,416, filed on Dec. 16, 2009, now Pat. No. 8,307,462, which is a continuation-in-part of application No. 12/220,152, filed on Jul. 22, 2008, now Pat. No. 7,685,648.

(60) Provisional application No. 61/712,241, filed on Oct. 10, 2012.

(51) Int. Cl.
*A41D 13/04* (2006.01)

(52) U.S. Cl.
CPC .......... *A41D 13/04* (2013.01); *A41D 2400/422* (2013.01)

(58) Field of Classification Search
CPC ....... A41D 13/04; A41D 11/00; A41D 15/04; A41D 2400/422; A41D 3/08; A41D 23/00; A41D 27/20; A41D 27/208; A41D 27/201; A41D 2300/30; A41B 13/103; A41B 13/00; A41B 13/06; A41B 13/10
USPC .......... 2/48, 49.2, 50–52, 88, 69.5, 247, 49.4, 2/253, 69, 104, 49.1, 46, 94
See application file for complete search history.

(56) References Cited

U.S. PATENT DOCUMENTS

| | | | | |
|---|---|---|---|---|
| 1,538,982 A | * | 5/1925 | Grant | A41D 13/04 2/51 |
| 1,797,208 A | * | 3/1931 | Weisz | A41D 13/04 2/51 |
| D149,092 S | * | 3/1948 | Seidenbaum | D2/861 |
| 2,501,010 A | * | 3/1950 | Seidenbaum | A41B 13/10 15/210.1 |
| 2,697,465 A | * | 12/1954 | Johnson | A45C 15/00 2/48 |
| 2,722,685 A | * | 11/1955 | Lucas | A41B 13/10 2/48 |
| 2,766,454 A | * | 10/1956 | Rice | A41D 13/04 2/48 |
| 2,791,775 A | * | 5/1957 | Sartell | A41D 15/04 2/69.5 |
| 2,846,685 A | * | 8/1958 | Ehrich | A41D 13/0012 2/51 |
| 2,879,514 A | * | 3/1959 | Shapiro | A41D 13/04 2/48 |
| 3,629,865 A | * | 12/1971 | Weiner | A41D 13/04 2/48 |
| 4,014,045 A | * | 3/1977 | Moyer | A41D 13/04 2/51 |

(Continued)

*Primary Examiner* — Amy Vanatta
(74) *Attorney, Agent, or Firm* — Nancy J. Flint, Esq.; Nancy J. Flint, Attorney At Law, P.A.

(57) ABSTRACT

A bath towel bib including a collar adapted to form a releasably securable loop around a user's neck, an actuatable means for releasing the loop from around the user's neck, and an absorbent cloth fixedly attached to the collar and operatively arranged to hang from the collar in front of the user's torso when the loop is releasably secured around the user's neck, wherein the actuatable means for releasing the loop from around the user's neck is operatively arranged to actuate when the absorbent cloth is pulled in a direction away from the user's neck. Further, the invention relates to a combination bath towel and bib with a built-in tote bag that allows a user to easily fold and carry the combination bath towel and bib with built-in tote bag in the nature of a backpack.

16 Claims, 21 Drawing Sheets

(56) References Cited

U.S. PATENT DOCUMENTS

| | | | | | |
|---|---|---|---|---|---|
| 4,301,547 | A | * | 11/1981 | Bloise | A41D 3/08 2/88 |
| 4,321,709 | A | * | 3/1982 | Steinberg | A41D 23/00 2/207 |
| D275,827 | S | * | 10/1984 | Henry | D2/864 |
| 4,685,154 | A | * | 8/1987 | Smith | A41B 13/00 2/48 |
| 4,700,409 | A | * | 10/1987 | De Lott | A45F 4/12 2/102 |
| D311,087 | S | * | 10/1990 | Pickard | D2/861 |
| 5,165,111 | A | * | 11/1992 | Lieberman | A45F 3/04 2/108 |
| D343,498 | S | * | 1/1994 | Donahue | D2/864 |
| D366,556 | S | * | 1/1996 | Wilson | D2/600 |
| 5,483,701 | A | * | 1/1996 | Ferreyros | A41B 13/103 2/247 |
| 5,699,560 | A | * | 12/1997 | Greenberg | A41D 3/00 2/108 |
| 5,787,504 | A | * | 8/1998 | Wu | A41D 15/04 2/93 |
| D398,140 | S | * | 9/1998 | Lion | D2/860 |
| 5,799,336 | A | * | 9/1998 | Cooper | A41D 27/20 2/247 |
| D404,539 | S | * | 1/1999 | Glasser | D2/830 |
| 6,536,047 | B1 | * | 3/2003 | Mullaly | A41B 13/06 2/48 |
| 6,594,829 | B1 | * | 7/2003 | Turkheimer | A41D 13/04 2/69 |
| 6,865,749 | B2 | * | 3/2005 | Mohney | A41B 13/10 2/48 |
| 7,114,190 | B2 | * | 10/2006 | Najarian | A41D 13/04 2/247 |
| 8,020,217 | B2 | * | 9/2011 | Moore | A41D 13/06 2/104 |
| 2002/0088048 | A1 | * | 7/2002 | Turner | A41D 3/00 2/93 |
| 2006/0143769 | A1 | * | 7/2006 | Pathak | A41D 13/04 2/48 |
| 2008/0209612 | A1 | * | 9/2008 | Summers | A41D 15/04 2/84 |
| 2011/0035857 | A1 | * | 2/2011 | Quintanilla | A41D 1/205 2/52 |
| 2012/0185993 | A1 | * | 7/2012 | Cohen | A41D 3/08 2/69 |

* cited by examiner

BATH TOWEL BIB WITH BUILT-IN TOTE BAG

RELATED APPLICATIONS

This application claims the benefit of U.S. patent application Ser. No. 12/639,416, filed on Dec. 16, 2009 and now issued as U.S. Pat. No. 8,307,462, which is a continuation-in-part of U.S. patent application Ser. No. 12/220,152, filed on Jul. 22, 2008 and now issued as U.S. Pat. No. 7,685,648. This application is also a non-provisional of U.S. Provisional Patent Application No. 61/712,241, filed on Oct. 10, 2012, which are incorporated herein in their entirety.

FIELD OF THE INVENTION

The invention generally relates to bath towels and bibs. In particular, the invention relates to a combination bath towel and bib, which is particularly adapted for bathing infants and pets. Further, the invention relates to a combination bath towel and bib with a built-in tote bag that allows a user to easily fold and carry the combination bath towel and bib.

BACKGROUND OF THE INVENTION

Bathing can be an important bonding experience for a parent and her infant. The tactile sensation the infant receives as the parent washes its body is stimulating and helps develop their relationship. It is desirable for a parent to utilize both her hands as she washes her infant to maximize the effect. Moreover, when the infant is especially young, for example, when the infant is a newborn baby, the parent needs both hands free to cradle the infant's head and maneuver its body. Bathing can also be a messy experience for a parent. This is especially the case with older infants, who tend to play and splash water everywhere.

Once bathing is complete, the wet parent generally will reach for a nearby towel, throw the towel over her shoulder or pin it between her chin and chest, in order to free her hands to reach for the infant, and then lift the wet infant from the bath and start wrapping it in the towel. This process usually requires the adjustment of the infant in the towel, or worse yet, it requires laying the infant down on a changing table or bed, spreading open the towel, which can chill the wet infant, and subsequently rewrapping it in the towel. The chilling of a wet infant can lead to a crying wet infant, which can lead to the infant forming negative associations with bathing, thereby undercutting what should be a meaningful bonding experience between the parent and her infant.

Therefore, there is a long-felt need for a means for maintaining dryness while bathing an infant. There is also a long-felt need for a bath towel which is arranged to receive an infant from a bath, while allowing a parent to keep her hands free.

Bathing a pet can present similar problems. The bather often becomes soaked during the process and similarly requires the freedom of both hands to handle the pet during the bath. There is thus further a need for maintaining dryness of a bather while bathing a pet, which can be met by a bath towel arranged to receive a pet from a bath, while allowing the bather to keep her hands free.

BRIEF SUMMARY OF THE INVENTION

Broadly, the present invention is a bath towel bib including a collar adapted to form a releasably securable loop around a user's neck, an actuatable means for releasing the loop from around the user's neck, and an absorbent cloth fixedly attached to the collar and operatively arranged to hang from the collar in front of the user's torso when the loop is releasably secured around the user's neck, wherein the actuatable means for releasing the loop from around the user's neck is operatively arranged to actuate when the absorbent cloth is pulled in a direction away from the user's neck.

Various embodiments of the actuatable means for releasing the loop from around the user's neck are contemplated, as shown and described herein. Regardless of the embodiments, however, such means provides the user with the ability to use both her hands to bath an infant, wrap the wet infant in the absorbent cloth hanging from her neck in front of her torso, and pull the collar off simply by pulling the absorbent cloth, with the infant wrapped therein, in a direction away from her neck.

In one embodiment of the invention, the combination bath towel and bib comprises a built-in tote bag that allows the user to easily fold and carry the bath towel and tote bag as a backpack. The interior cavity of the tote bag may be lined, and the outer surface and the lining of the tote bag may comprise a water-proof or water-resistant material if desired. The interior cavity of the tote bag may be provided with pockets or loops for securing items, if desired. The bath towel may be used for bathing or for swimming or other uses.

It is an object of the present invention to provide a means for maintaining dryness while bathing an infant or a pet.

It also an object of the invention to provide a bath towel which is arranged to receive an infant or a pet from a bath, while allowing the parent or bather to keep her hands free.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 17b is a back view of the bath towel bib with built-in tote bag of FIG. 17a.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular 20 methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
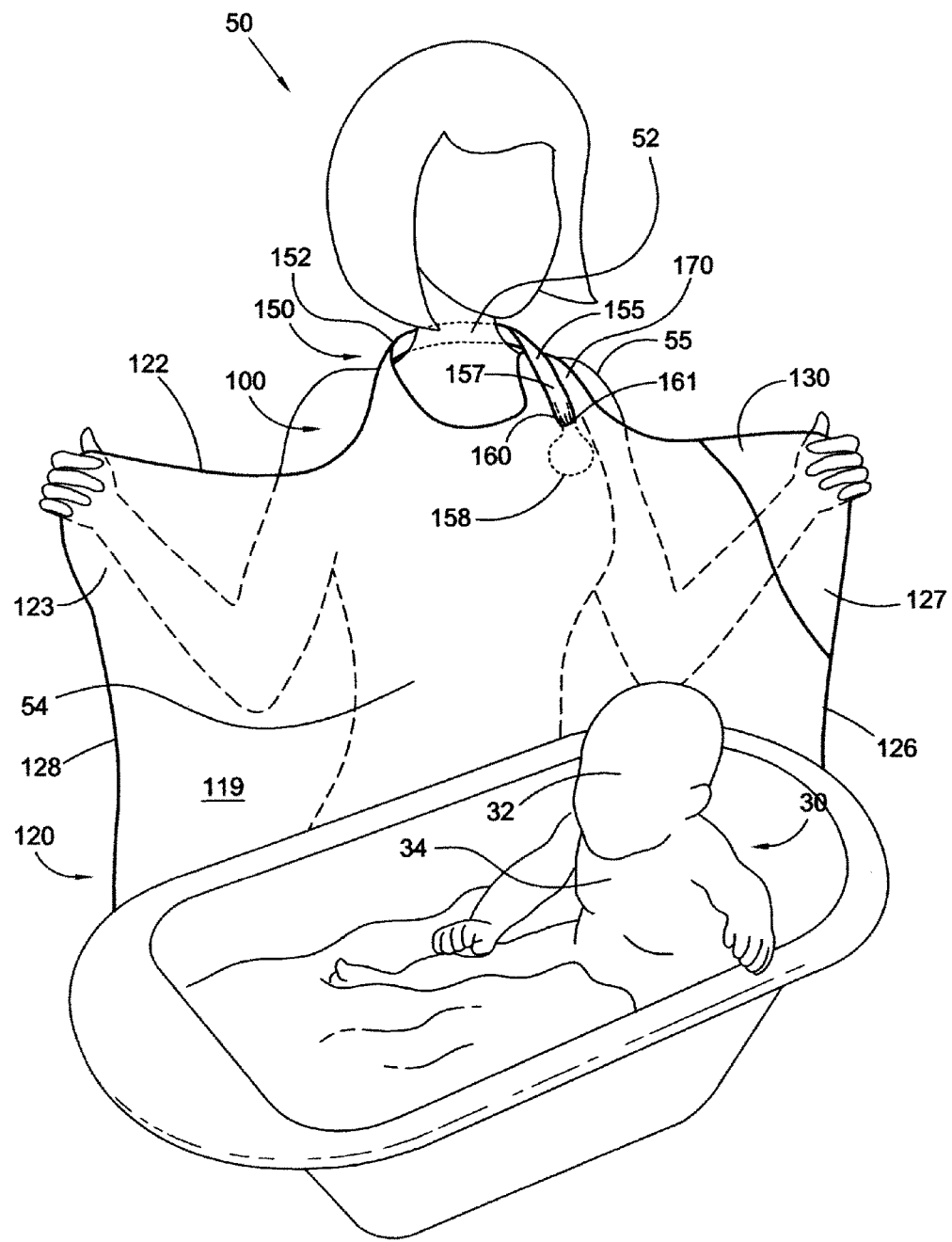
FIG. 1 is a front perspective view of a user displaying a first embodiment of the present invention bath towel bib while bathing an infant.

The following description is best understood in view of FIGS. 1-5. FIG. 1 is a front perspective view of user 50 displaying a first embodiment of present invention bath towel bib 100 while bathing infant 30. User 50 includes neck 52, torso 54, and shoulder 55. Infant 30 includes head 32 and body 34. Hereinafter, the term "actuate" means to be put into mechanical action or motion, and the term "actuatable" means to have the ability to be actuated.

Figure 5:
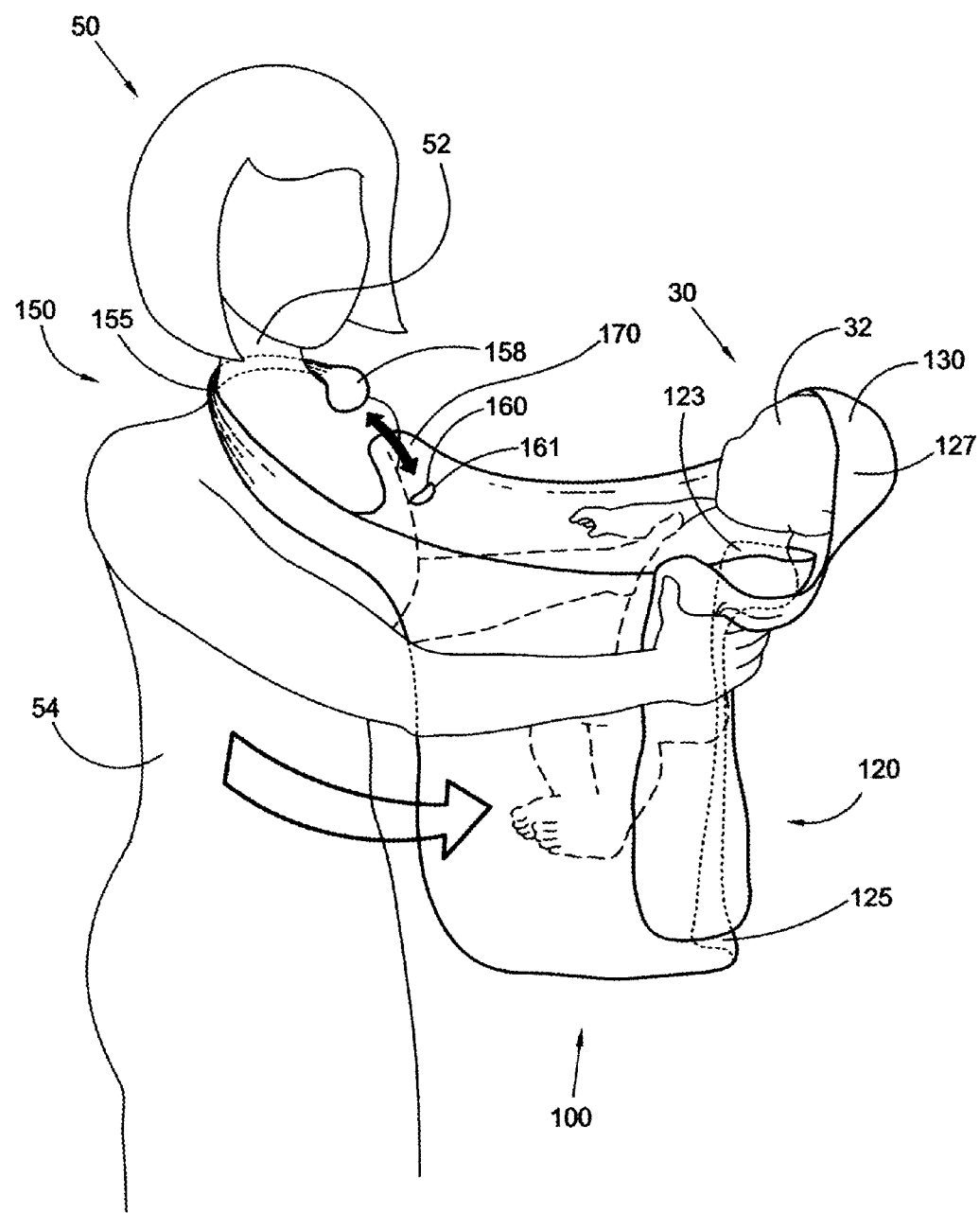
FIG. 5 is a front perspective view of a fourth step in utilizing the bath towel bib, showing the user pulling the absorbent cloth away from her neck.

Bath towel bib 100 comprises collar 150 adapted to form releasably securable loop 152 around neck 52, an actuatable means for releasing loop 152 from around neck 52, and absorbent cloth 120 fixedly attached to collar 150. Absorbent cloth 120 is operatively arranged to hang from collar 150 in front of torso 54 when loop 152 is releasably secured around neck 52. The actuatable means for releasing loop 152 from around neck 52 is operatively arranged to actuate when absorbent cloth 120 is pulled in a direction away from neck 52, as shown in FIG. 5 and described in further detail infra.

Figure 4:
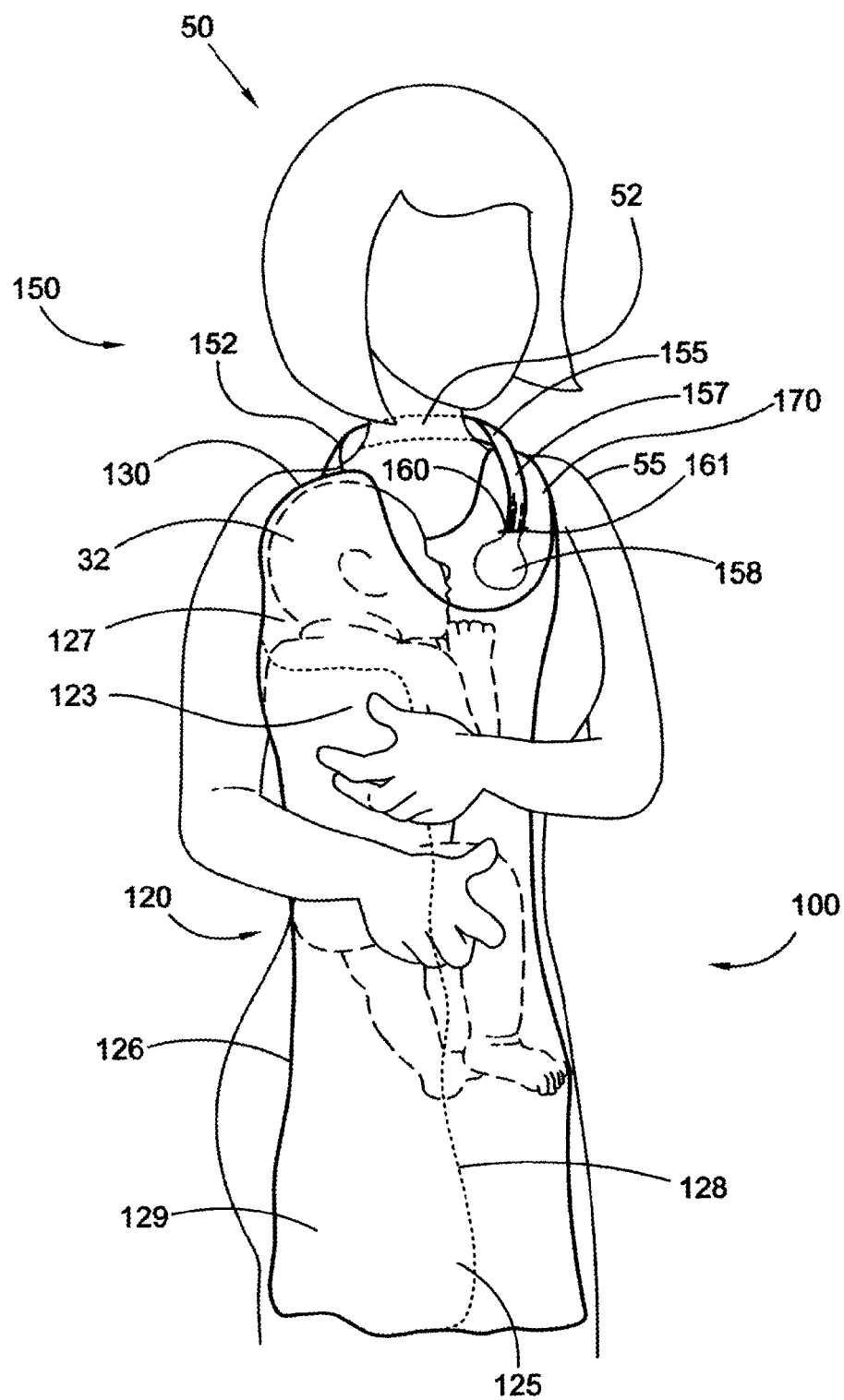
FIG. 4 is a front perspective view of a third step in utilizing the bath towel bib, showing the user covering the infant's head with the hood.

Absorbent cloth 120 comprises any suitable absorbent cloth, for example, linen or terrycloth. As shown in the figures, absorbent cloth 120 includes front surface 119 and may be substantially rectangular. If rectangular, it generally comprises first upper corner region 123, second upper corner region 127, first lower corner region 125, and second lower corner region 129, as well as upper edge 122, lower edge 124, first side edge 128, and second side edge 126. In a preferred embodiment, first and/or second upper corner regions, 123 and/or 127, respectively, comprises hood 130. Hood 130 is operatively arranged to cover head 32 of infant 30 as shown in FIGS. 4 and 5. Regardless of the embodiment, absorbent cloth 120 is adapted to substantially cover and/or shield the front of the user's torso when it is arranged hangingly from collar 150. This hanging arrangement also allows user 50 to keep both of her hands free while she is bathing infant 30.

Absorbent cloth 120 may further comprise extension 170 which is adapted to rest on one of the user's shoulders. Extension 170 may be an extension of the material from which absorbent cloth 120 is made, or a separate piece of material fixedly secured to such material. Extension 170 is arranged, in part, to stabilize bath towel bib 100 on user 50.

In its first embodiment, as shown in FIGS. 1-5, bath towel bib 100 further comprises aperture 160 having inner surface 161, and loop 152 comprises strap 155 extending from absorbent cloth 120 proximate a first side of the user's neck 52. This embodiment includes extension 170 adapted to rest on the user's shoulder on the side of the user's neck 52 opposite the first side. Strap 155 includes first end 158 and outer surface 157. First end 158 is insertable in aperture 160. While aperture 160 may be arranged anywhere on bath towel bib 100 within reach of first end 158, in this embodiment, aperture 160 is arranged on absorbent cloth 120 proximate extension 170. In this embodiment, the actuatable means for releasing loop 152 from around neck 52 comprises a frictional engagement between outer surface 157 and inner surface 161, when first end 156 is arranged in aperture 160.

The aforementioned frictional engagement comprises a static friction sufficient to maintain the form of loop 52 around neck 52 when absorbent cloth 120 hangs from collar 150 in front of the user's torso 54, but insufficient to maintain the form of loop 52 when absorbent cloth 120 is pulled in a direction away from the user's neck 52, as shown in FIG. 5. In a preferred embodiment, as shown in the figures, first end 158 is larger than aperture 160 in order to provide ample static friction to maintain the form of loop 52 around neck 52. An enlarged first end 158, relative to aperture 160, is particularly advantageous when the weight of absorbent cloth 120 increases as it absorbs water during use.

FIGS. 2-5 show a preferred method of utilizing bath towel bib 100. While these particular figures only show the first embodiment of the present invention bath towel bib, the method described hereinbelow generally applies to all of its embodiments, including those shown in FIGS. 6-10, as well as any other embodiments within the scope and spirit of the invention.

Figure 2:
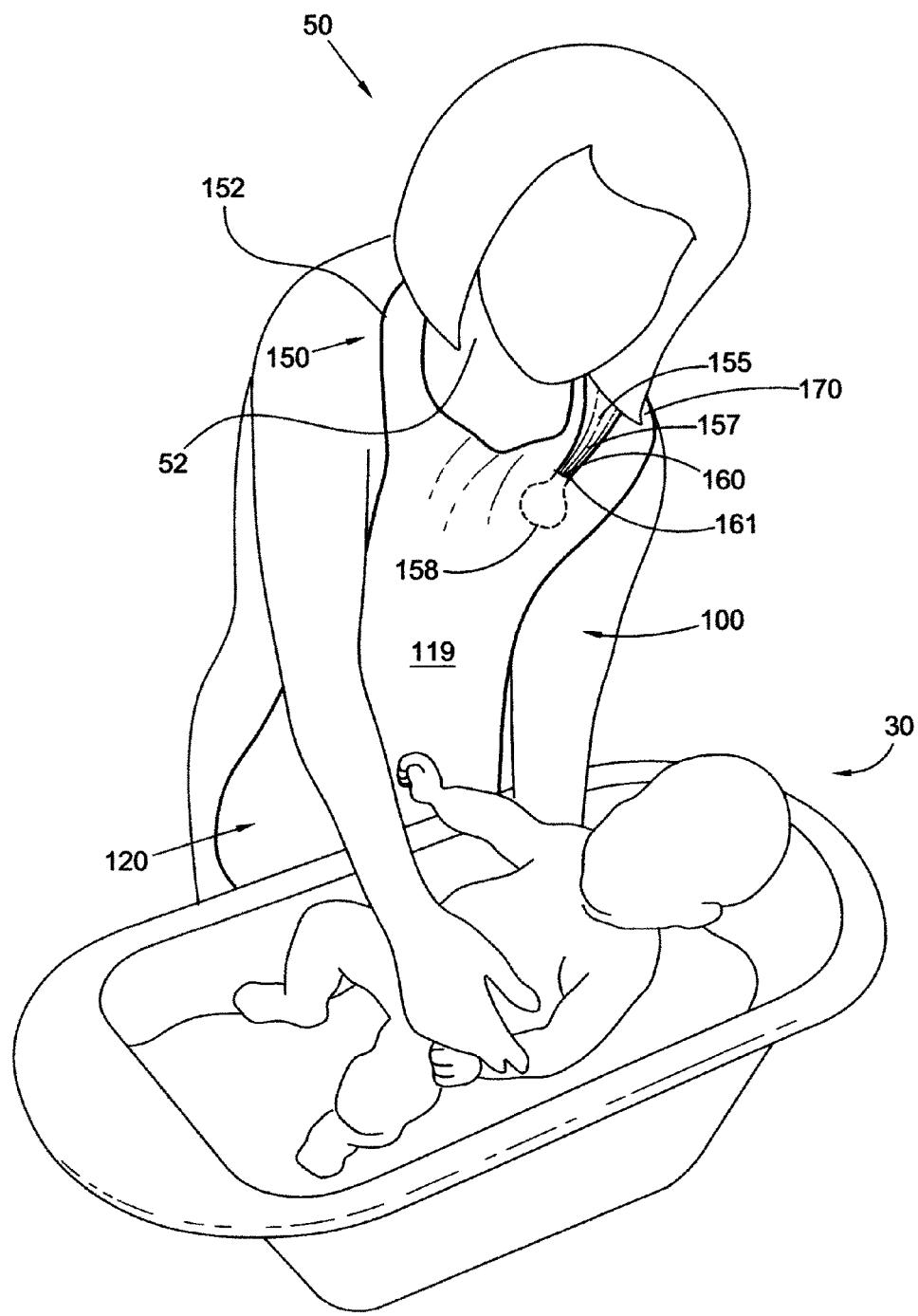
FIG. 2 is a front perspective view of a first step in utilizing the bath towel bib, showing the user picking up the wet infant.

The first step is illustrated in FIG. 2, which shows user 50 with collar 150 forming loop 152, releasably secured around her neck 52, from which absorbent cloth 120 hangs in front of her torso 54, shielding her from the bath water. In this figure, user 50 is beginning to lift infant 30 from the bath.

Figure 3:
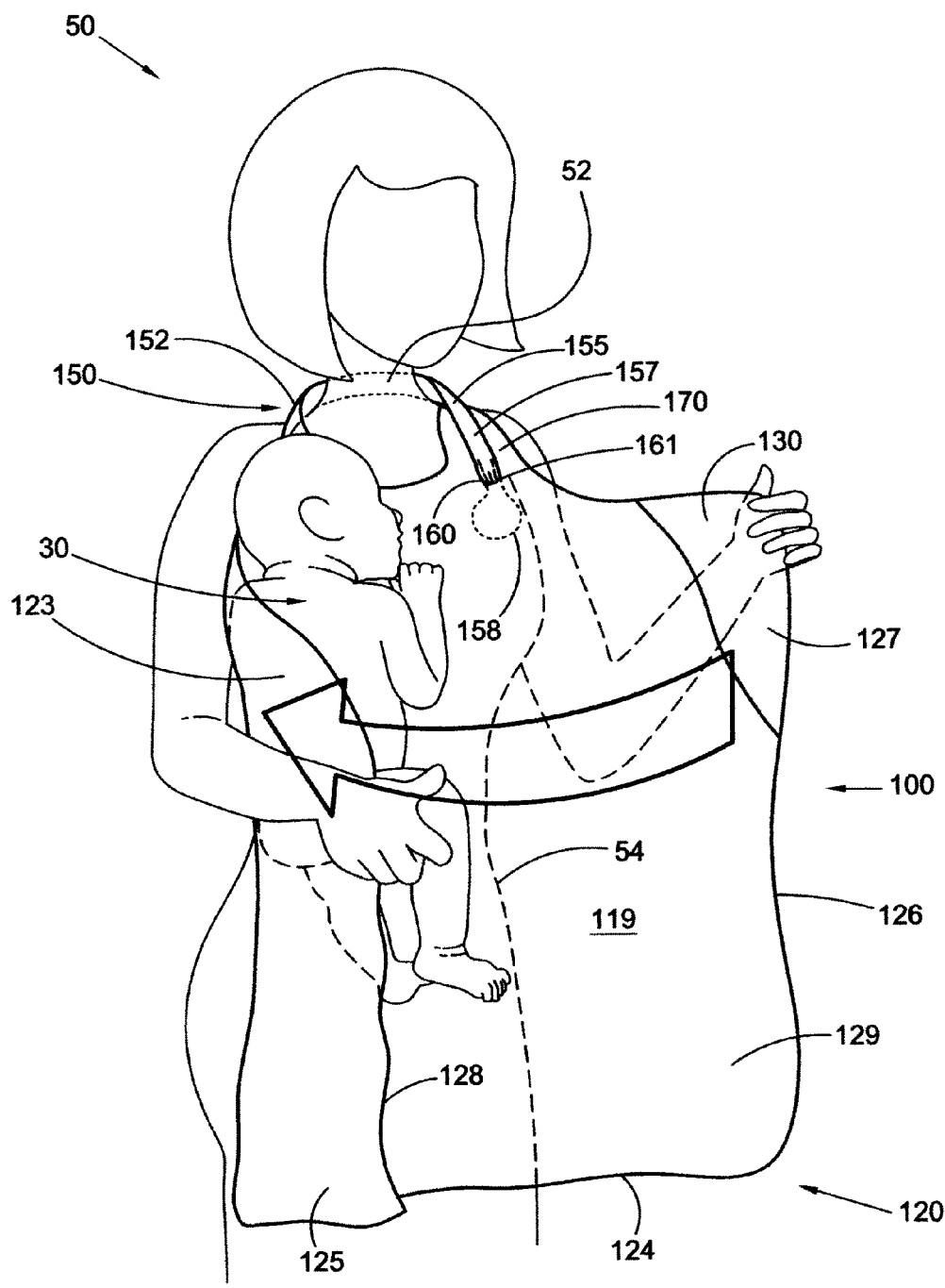
FIG. 3 is a front perspective view of a second step in utilizing the bath towel bib, showing the user holding the infant within a first upper corner region of an absorbent cloth of the bath towel bib and beginning to bring a second upper corner region comprising a hood toward the infant's head.

The second step is illustrated in FIG. 3, which shows user 50 holding in one arm infant 30 against front surface 119 and within a folded first upper corner region 123. With her free hand, user 50 is shown holding second upper corner region 127, which comprises hood 130, as she is preparing to bring hood 130 toward head 32 of infant 30, which is illustrated by the arrow. FIG. 4 illustrates the third step, wherein user 50 has infant 30 still wrapped within first upper corner region 123, as shown in FIG. 3, and further wrapped within second upper corner region 127 with hood 130 covering the infant's head 32.

FIG. 5 illustrates the fourth step, wherein user 50 user pulls absorbent cloth 120 in a direction away from her neck 52, as indicated by the arrow pointing away from her neck. As shown in the figure, infant 30 remains snuggly within the folds of absorbent cloth 120 during this step. As described supra, the actuatable means for releasing loop 152 from around the user's neck 52 comprises a frictional engagement between outer surface 157 of strap 155 and inner surface 161 of aperture 160, when first end 156 is arranged therein. The static friction of the frictional engagement, when first end 158 is at rest within aperture 160, is sufficient to maintain the form of loop 52 around neck 52. However, the static friction is insufficient to maintain the form of loop 52 when user 50 pulls absorbent cloth 120 in a direction away from her neck 52, as illustrated by the double-headed arrow showing first end 158 and aperture 160 being pulled apart, thereby releasing the user's neck 52 from loop 152. When the entirety of bath towel bib 100 is pulled away from user 50, after the completion of the fourth step, infant 30 is wrapped within bath towel bib 100.

Figure 6:
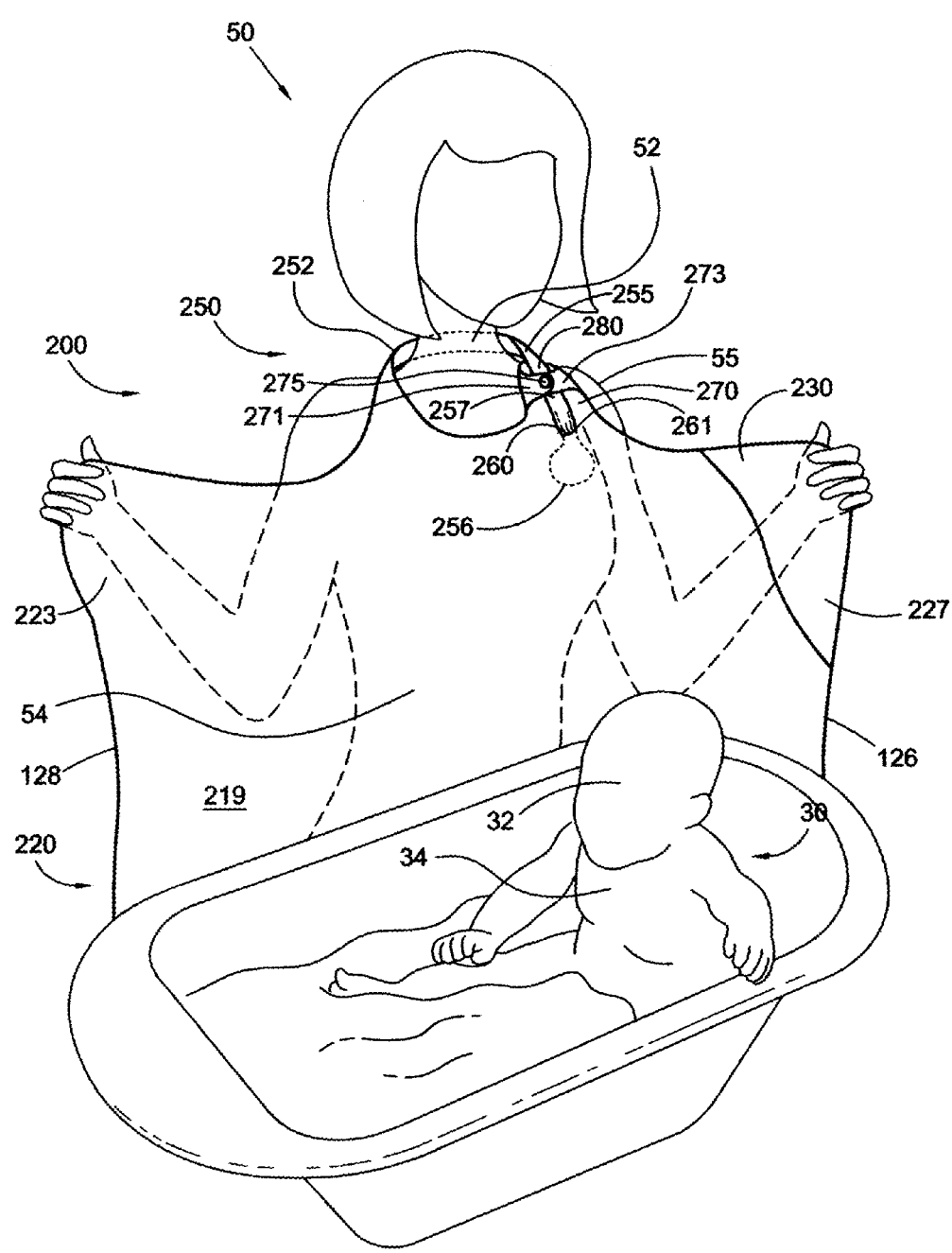
FIG. 6 is a front perspective view of a user displaying a second embodiment of the present invention bath towel bib while bathing an infant.

FIG. 6 is a front perspective view of user 50 displaying a second embodiment of the present invention bath towel bib, hereinafter referred to as bath towel bib 200. Similar to bath towel bib 100, bath towel bib 200 comprises collar 250 adapted to form releasably securable loop 252 around the user's neck 52, an actuatable means for releasing loop 252 from around the user's neck 52, and absorbent cloth 220 fixedly attached to collar 250. Absorbent cloth 220 is operatively arranged to hang from collar 250 in front of the user's torso 54 when loop 252 is releasably secured around the user's neck 52. The actuatable means for releasing loop 252 from around neck 52 is operatively arranged to actuate when absorbent cloth 220 is pulled in a direction away from neck 52, similar to that which is shown in FIG. 5 and described in detail supra.

Absorbent cloth 220 may comprise any suitable absorbent cloth. As shown in the figures, absorbent cloth 220 includes front surface 219 and may be substantially rectangular. If rectangular, absorbent cloth 220 generally comprises first upper corner region 223, second upper corner region 227, a first lower corner region (not shown), and a second lower corner region (not shown). In a preferred embodiment, first and/or second upper corner regions, 223 and/or 227, respectively, comprises hood 230. Hood 230 is operatively arranged to cover head 32 of infant 30. Absorbent cloth 220 is adapted to substantially cover and/or shield the front of the user's torso 54 when it is arranged hangingly from collar 250. This hanging arrangement also allows user 50 to keep both of her hands free while she is bathing infant 30.

Absorbent cloth 220 further comprises extension 270, which is adapted to rest on a shoulder of user 50. Extension 270 may be an extension of the material from which absorbent cloth 220 is made, or a separate piece of material fixedly secured to such material.

Bath towel bib 200 further comprises first aperture 260 and second aperture 280. First aperture 260 is arranged on absorbent cloth 220 proximate extension 270 and includes first inner surface 261. Extension 270 forms second aperture 280, which includes second inner surface 281. Preferably, as shown in FIG. 6, second aperture 280 is arranged as a tube, which may be in the form of at least two flaps, 271 and 273. Flaps 271 and 273 are arranged to fold over and be secured to each other. They may be secured to each other by any suitable means known in the art, for example, snap button 275, hook-and-loop fasteners, stitching, etc.

Loop 252 comprises strap 255 extending from absorbent cloth 220 proximate a first side of the user's neck 52. Strap 255 includes first end 256 and outer surface 257. First end 256 is insertable in first aperture 260 and second aperture 280. In this embodiment, the actuatable means for releasing loop 252 from around the user's neck 52 comprises a first frictional engagement between outer surface 257 and first inner surface 261, and a second frictional engagement between outer surface 257 and second inner surface 281, when first end 256 is arranged in first and second apertures 260 and 280, respectively.

Each of the first and second frictional engagements may comprise a static friction sufficient to maintain the form of loop 252 around the user's neck 52 when absorbent cloth 220 hangs from collar 250 in front of the user's torso 54. In the alternative, the first and second frictional engagements may be designed such that both are required to maintain the form of loop 252 around the user's neck 52 under such conditions. Regardless, both the first and second frictional engagements are insufficient, alone and in combination, to maintain the form of loop 252 when absorbent cloth 220 is pulled in a direction away from the user's neck 52. Preferably, first end 256 is larger than at least first aperture 260, and possibly second aperture 280, in order to provide ample static friction to maintain the form of loop 252 around the user's neck 52.

Figure 7:
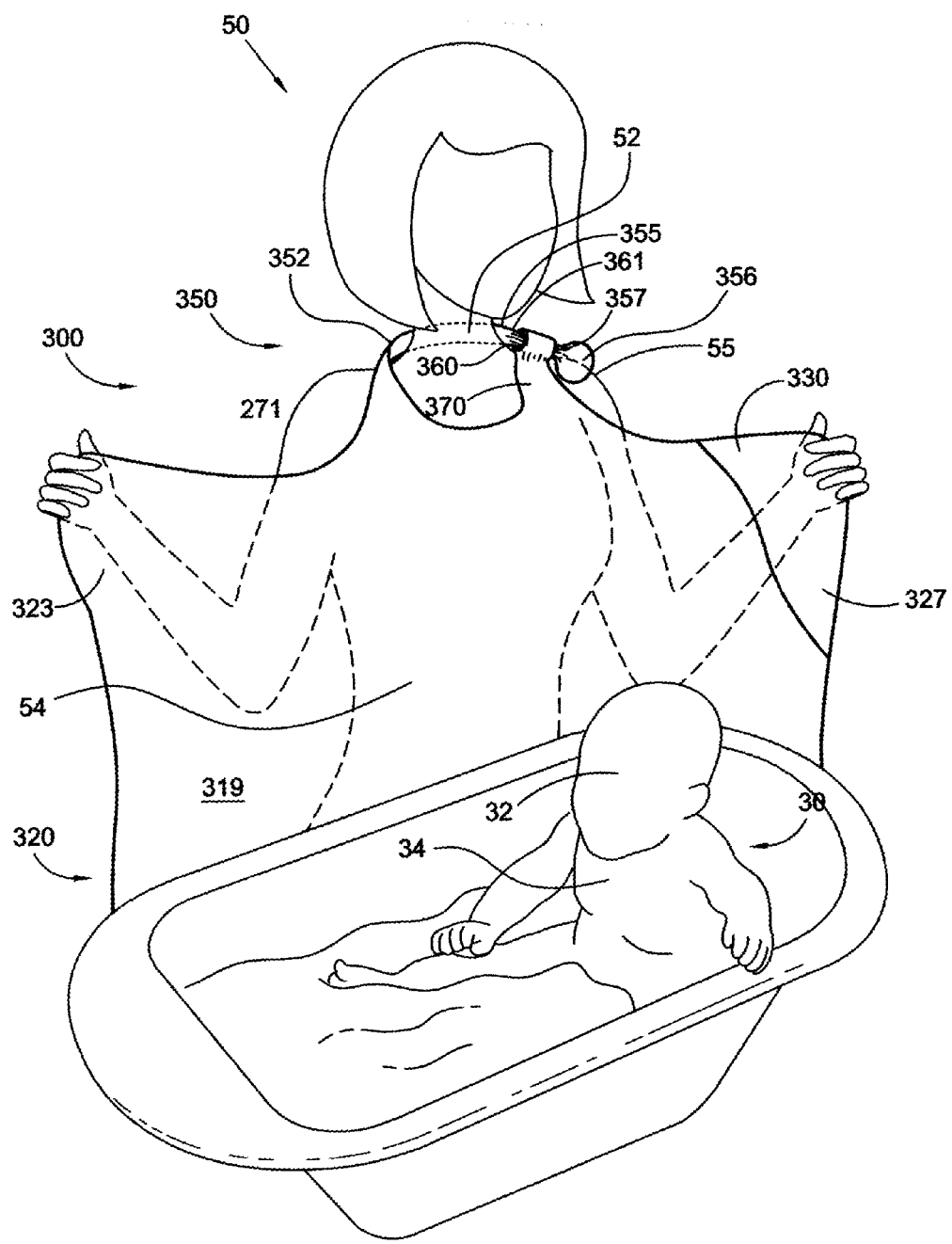
FIG. 7 is a front perspective view of a user displaying a third embodiment of the present invention bath towel bib while bathing an infant.

FIG. 7 is a front perspective view of user 50 displaying a third embodiment of the present invention bath towel bib, hereinafter referred to as bath towel bib 300. Bath towel bib 300 comprises collar 350 adapted to form releasably securable loop 352 around the user's neck 52, an actuatable means for releasing loop 352 from around the user's neck 52, and absorbent cloth 320 fixedly attached to collar 350. Absorbent cloth 320 is operatively arranged to hang from collar 350 in front of the user's torso 54 when loop 352 is releasably secured around the 5 user's neck 52. The actuatable means for releasing loop 352 from around neck 52 is operatively arranged to actuate when absorbent cloth 320 is pulled in a direction away from the user's neck 52, similar to that which is shown in FIG. 5 and described in detail supra.

Absorbent cloth 320 may comprise any suitable absorbent cloth. As shown in the figures, absorbent cloth 320 includes front surface 319 and may be substantially rectangular. If rectangular, absorbent cloth 320 generally comprises first upper corner region 323, second upper corner region 327, a first lower corner region (not shown), and a second lower corner region (not shown). In a preferred embodiment, first and/or second upper corner regions, 323 and/or 327, respectively, comprises hood 330. Hood 330 is operatively arranged to cover head 32 of infant 30. Absorbent cloth 320 is adapted to substantially cover and/or shield the front of the user's torso 54 when it is arranged hangingly from collar 350. This hanging arrangement also allows user 50 to keep both of her hands free while she is bathing infant 30.

Absorbent cloth 320 further comprises extension 370, which is adapted to rest on a shoulder of user 50. Extension 370 may be an extension of the material from which absorbent cloth 320 is made, or a separate piece of material fixedly secured to such material. Extension 370 forms aperture 360. Aperture 360 includes inner surface 361 and, as shown in this figure, is preferably arranged as a tube. In this embodiment, the tube may be formed by rolling the end of extension 370 over and stitching its edge to its back or front side.

Loop 352 comprises strap 355 extending from absorbent cloth 320 proximate a first side of the user's neck 52. Strap 355 includes first end 356 and outer surface 357. First end 356 is insertable in aperture 360. In this embodiment, the actuatable means for releasing loop 352 from around the user's neck 52 comprises a frictional engagement between outer surface 357 and inner surface 361, when first end 356 is arranged in aperture 360.

The aforementioned frictional engagement comprises a static friction sufficient to maintain the form of loop 352 around the user's neck 52 when absorbent cloth 320 hangs from 30 collar 350 in front of the user's torso 54, but insufficient to maintain the form of loop 352 when absorbent cloth 320 is pulled in a direction away from the user's neck 52. Preferably, first end 356 is larger than aperture 360, in order to provide ample static friction to maintain the form of loop 352 around the user's neck 52.

Figure 8A:
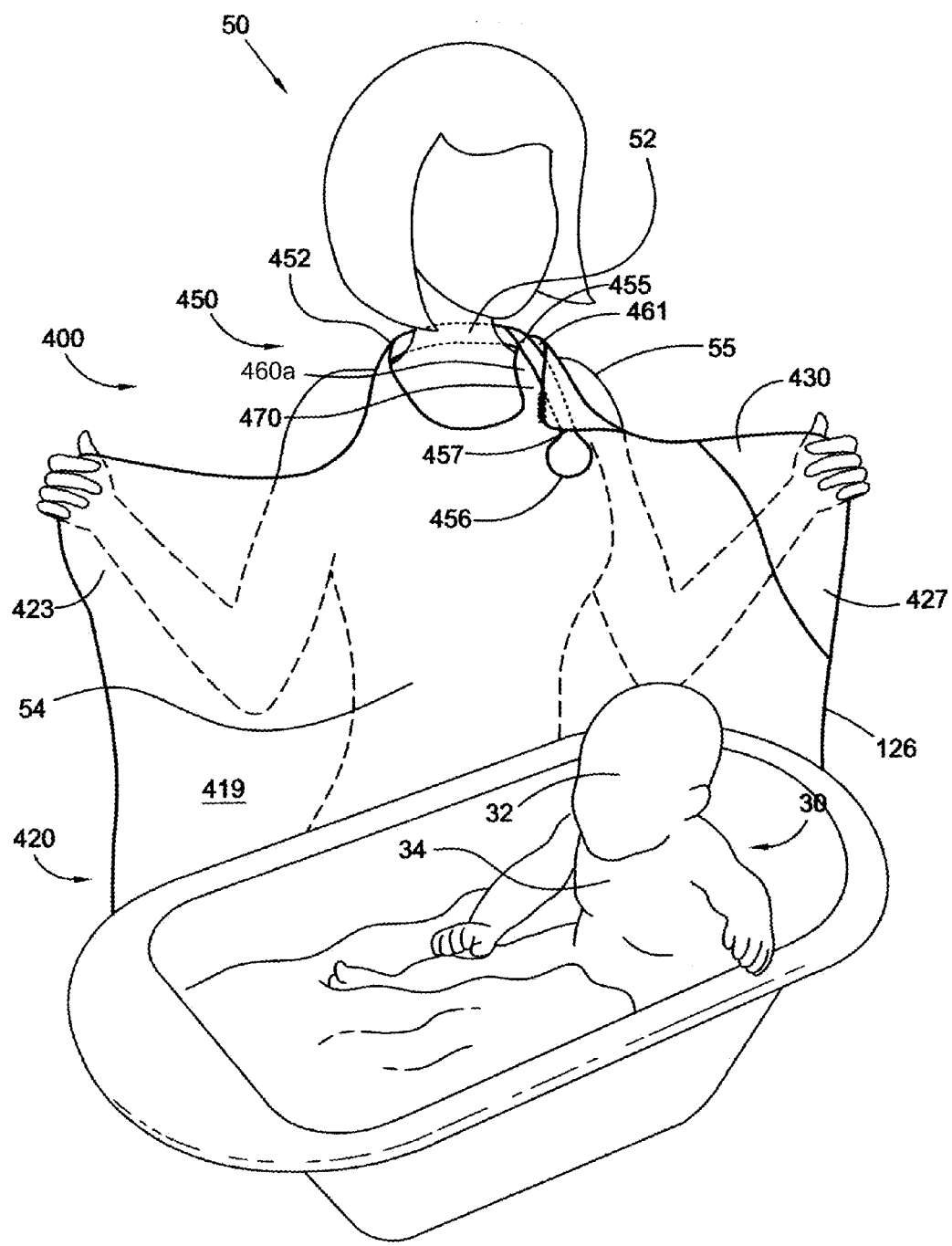
FIG. 8a is a front perspective view of a user displaying a fourth embodiment of the present invention bath towel bib while bathing an infant.

FIG. 8*a* is a front perspective view of user 50 displaying a fourth embodiment of the present invention bath towel bib, hereinafter referred to as bath towel bib 400. Bath towel bib 400 comprises collar 450 adapted to form releasably securable loop 452 around the user's neck 52, an actuatable means for releasing loop 452 from around the user's neck 52, and absorbent cloth 420 fixedly attached to collar 450. Absorbent cloth 420 is operatively arranged to hang from collar 450 in front of the user's torso 54 when loop 452 is releasably secured around the user's neck 52. The actuatable means for releasing loop 452 from around neck 52 is operatively arranged to actuate when absorbent cloth 420 is pulled in a direction away from the user's neck 52, similar to that which is shown in FIG. 5 and described in detail supra.

Absorbent cloth 420 may comprise any suitable absorbent cloth. As shown in the figures, absorbent cloth 420 includes front surface 419 and may be substantially rectangular. If rectangular, absorbent cloth 420 generally comprises first upper corner region 423, second upper corner region 427, a first lower corner region (not shown), and a second lower corner region (not shown). In a preferred embodiment, first and/or second upper corner regions, 423 and/or 427, respectively, comprises hood 430. Hood 430 is operatively arranged to cover head 32 of infant 30. Absorbent cloth 420 is adapted to substantially cover and/or shield the front of the user's torso 54 when it is arranged hangingly from collar 450. This hanging arrangement also allows user 50 to keep both of her hands free while she is bathing infant 30.

Absorbent cloth 420 further comprises extension 470, which is adapted to rest on a shoulder of user 50. Extension 470 may be an extension of the material from which absorbent cloth 420 is made, or a separate piece of material fixedly secured to such material. Extension 470 forms aperture 460. Aperture 460*a* includes inner surface 461 and, as shown in this figure, is preferably arranged as a tube. In this embodiment, the tube may be formed by folding a portion of extension 470 over and stitching its edge to its back or front side.

Loop 452 comprises strap 455 extending from absorbent cloth 420 proximate a first side of the user's neck 52. Strap 455 includes first end 456 and outer surface 457. First end 456 is insertable in aperture 460*a*. In this embodiment, the actuatable means for releasing loop 452 from around the user's neck 52 comprises a frictional engagement between outer surface 457 and inner surface 461, when first end 456 is arranged in aperture 460*a*.

Figure 8B:
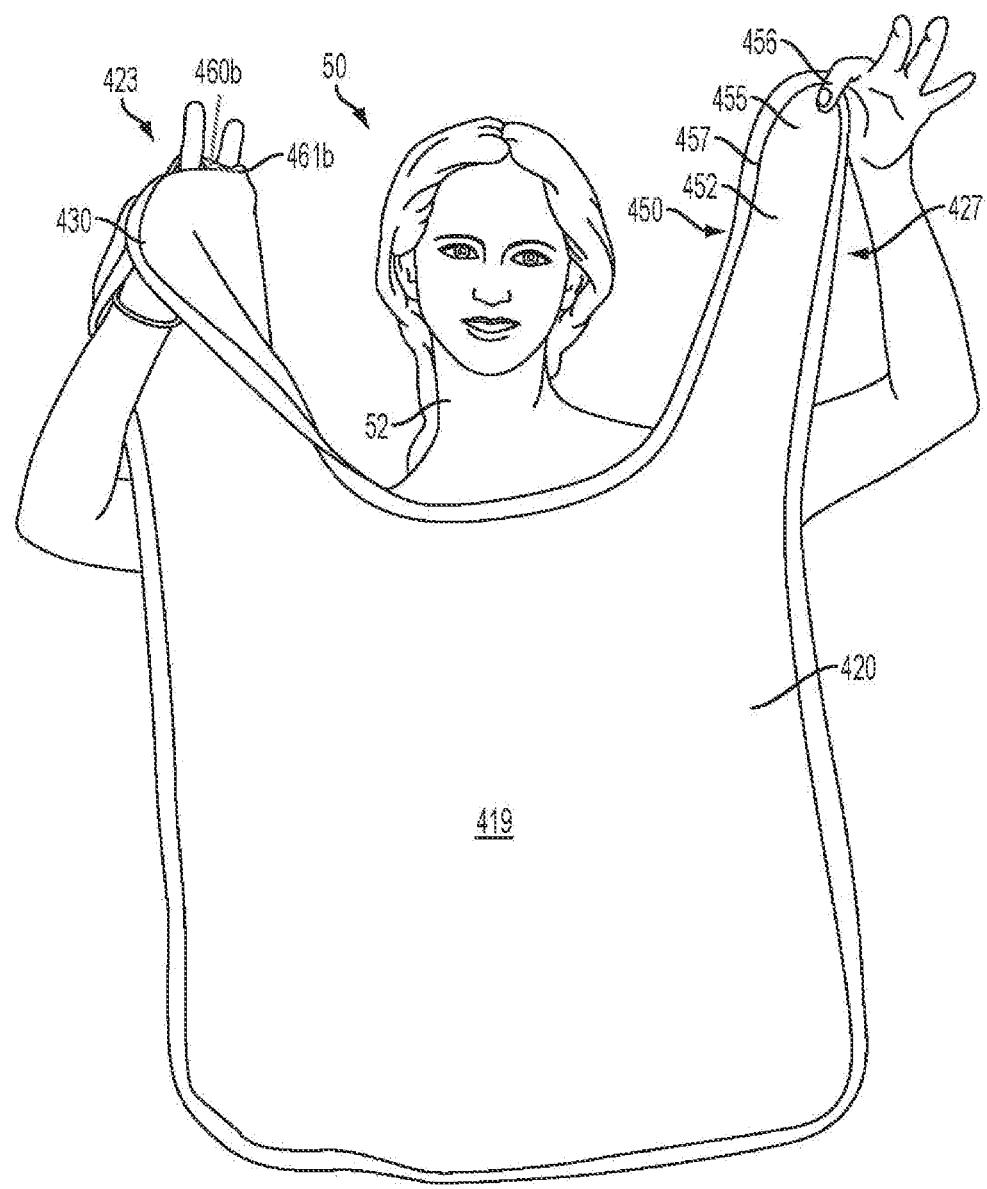
FIG. 8b is a front perspective view of a user displaying an alternative of the fourth embodiment of the present invention bath towel bib while bathing an infant.

According to the embodiment seen in FIG. 8*b*, first upper corner region 423 comprises hood 430 having aperture 460*b*, and second upper region 427 comprises loop 452 further comprising strap 455 extending from absorbent cloth 420 proximate a first side of the user's neck 52. Strap 455 includes first end 456 and outer surface 457. First end 456 is insertable in aperture 460*b*. In this embodiment, the actuatable means for releasing loop 452 from around the user's neck 52 comprises a frictional engagement between outer surface 457 and inner surface 461*b* of aperture 460*b*, when first end 456 is arranged in aperture 460*b*.

The aforementioned frictional engagement for both embodiments comprises a static friction sufficient to maintain the form of loop 452 around the user's neck 52 when absorbent cloth 420 hangs from collar 450 in front of the user's torso 54, but insufficient to maintain the form of loop 452 when absorbent cloth 420 is pulled in a direction away from the user's neck 52. Preferably, first end 456 is larger than apertures 460*a* or 460*b*, in order to provide ample static friction to maintain the form of loop 452 around the user's neck 52.

Figure 9:
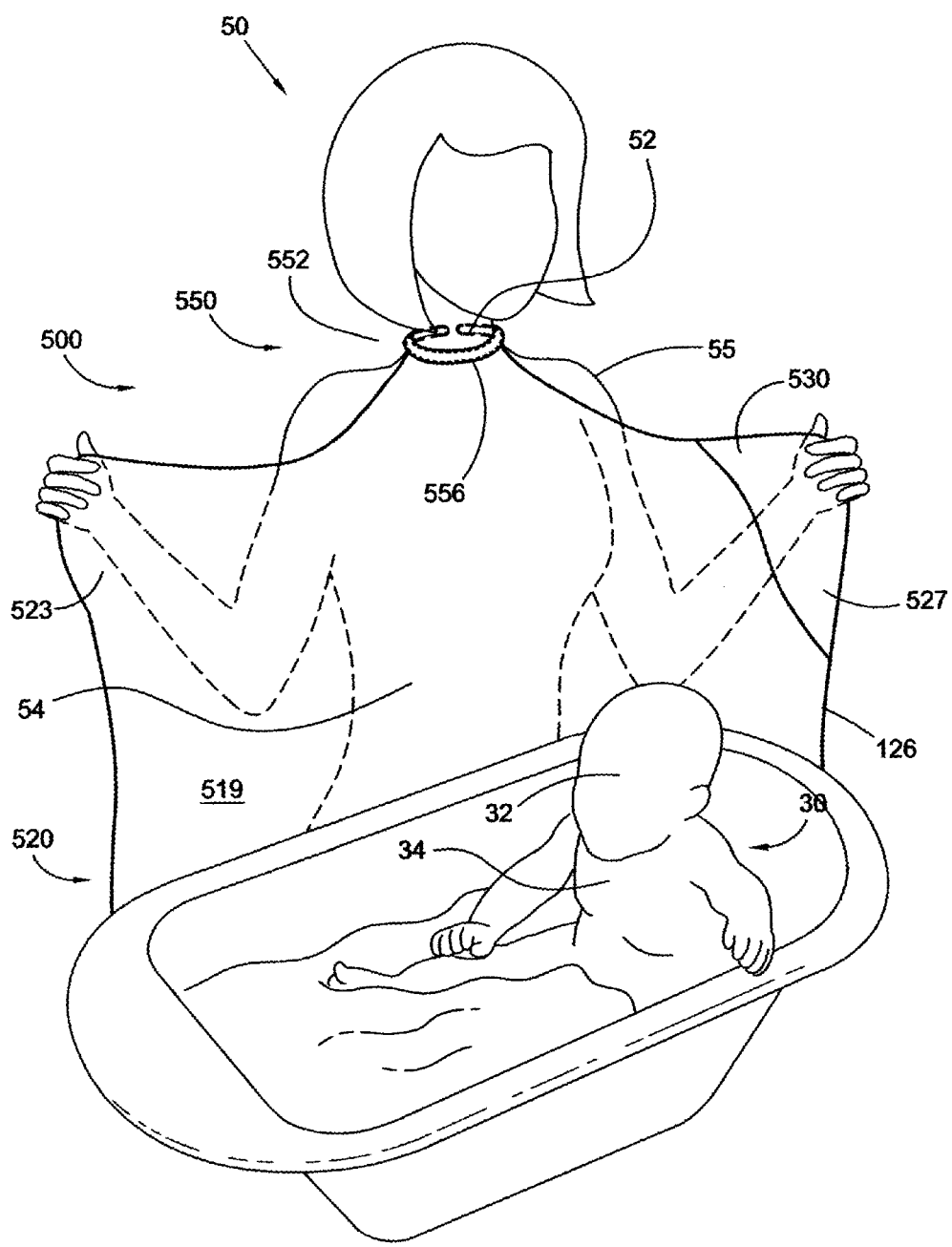
FIG. 9 is a front perspective view of a user displaying a fifth embodiment of the present invention bath towel bib while bathing an infant.

FIG. 9 is a front perspective view of user 50 displaying a fifth embodiment of the present invention bath towel bib, hereinafter referred to as bath towel bib 500. Bath towel bib 500 comprises collar 550 adapted to form releasably securable loop 552 around the user's neck 52, an actuatable means for releasing loop 552 from around the user's neck 52, and absorbent cloth 520 fixedly attached to collar 550. Absorbent cloth 520 is operatively arranged to hang from collar 550 in front of the user's torso 54 when loop 552 is releasably secured around the user's neck 52. The actuatable means for releasing loop 552 from around neck 52 is operatively arranged to actuate when absorbent cloth 520 is pulled in a direction away from the user's neck 52, similar to that which is shown in FIG. 5 and described in detail supra.

Absorbent cloth 520 may comprise any suitable absorbent cloth. As shown in the figures, absorbent cloth 520 includes front surface 519 and may be substantially rectangular. If rectangular, absorbent cloth 520 generally comprises first upper corner region 523, second upper corner region 527, a first lower corner region (not shown), and a second lower corner region (not shown). In a preferred embodiment, first and/or second upper corner regions, 523 and/or 527, respectively, comprises hood 530. Hood 530 is operatively arranged to cover head 32 of infant 30. Absorbent cloth 520 is adapted to substantially cover and/or shield the front of the user's torso 54 when it is arranged hangingly from collar 550. This hanging arrangement also allows user 50 to keep both of her hands free while she is bathing infant 30.

Loop 552 loop is in the form of C-shaped band 555 (shown in hatched lines), which comprises an elastic material. Hereinafter, a material is considered to be elastic if it deforms under stress (e.g., external forces), but returns to its original shape when the stress is removed. Band 555 extends from absorbent cloth 520 and is adapted to substantially surround the user's neck 52. In a preferred embodiment, band 555 is at least partially encased in semi-toroidal cloth 556, which serves as a means for securing band 555 to absorbent cloth 520, and provides soft engagement between the user's neck 52 and collar 550.

In this embodiment, the actuatable means for releasing loop 552 from around the user's neck 52 comprises the elasticity of the material band 555, wherein the elasticity is sufficient to maintain the form of loop 552 when absorbent cloth 520 hangs from collar 550 in front of the user's torso 54, but insufficient to maintain the form of loop 552 when absorbent cloth 520 is pulled in a direction away from the user's neck 52. Accordingly, band 555 may comprise any suitable elastic material, such as, plastic, rubber, etc.

Figure 10:
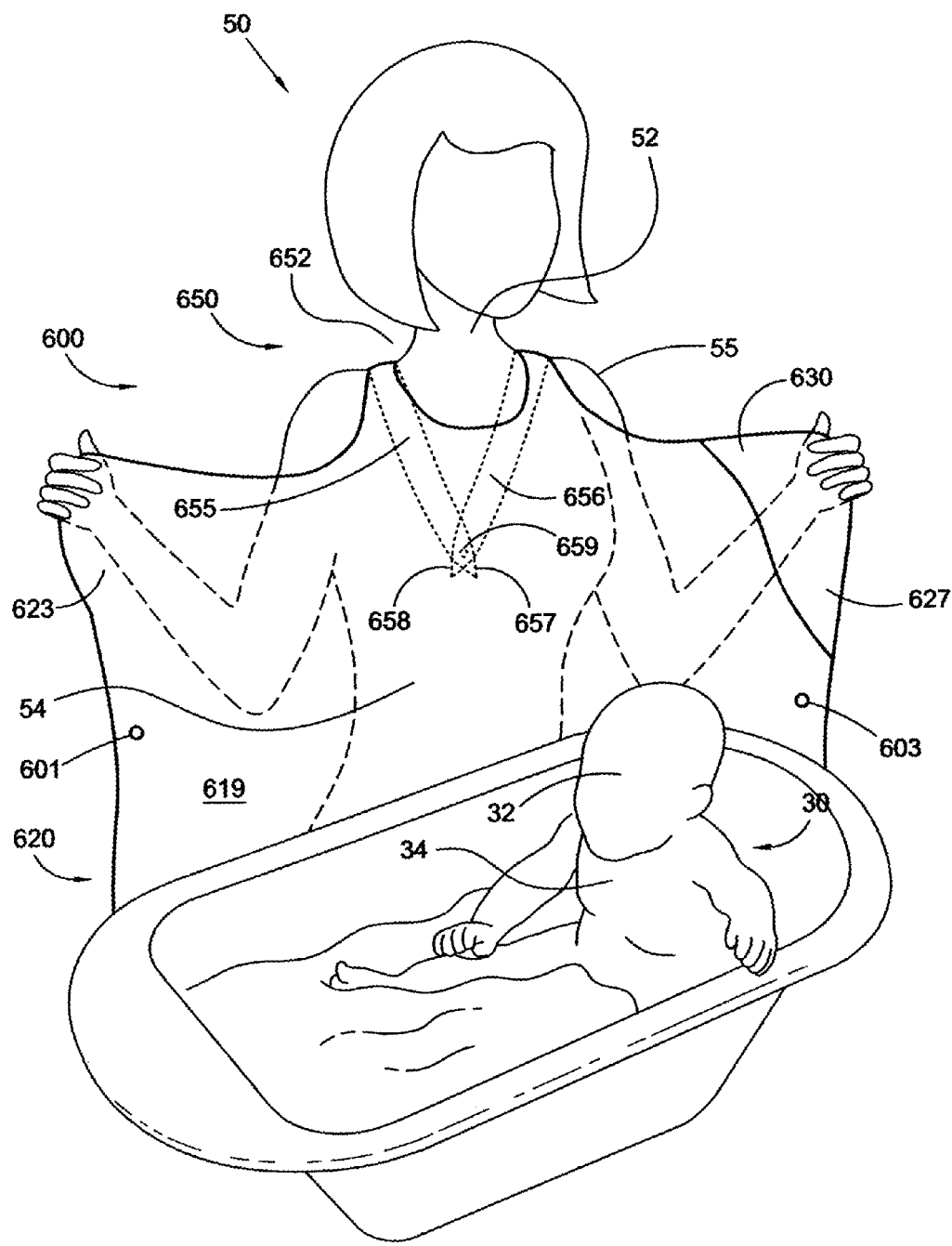
FIG. 10 is a front perspective view of a user displaying a sixth embodiment of the present invention bath towel bib while bathing an infant.

FIG. 10 is a front perspective view of user 50 displaying a sixth embodiment of the present invention bath towel bib, hereinafter referred to as bath towel bib 600. Bath towel bib 600 comprises collar 650 adapted to form releasably securable loop 652 around the user's neck 52, an actuatable means for releasing loop 652 from around the user's neck 52, and absorbent cloth 620 fixedly attached to collar 650. Absorbent cloth 620 is operatively arranged to hang from collar 650 in front of the user's torso 54 when loop 652 is releasably secured around the user's neck 52. The actuatable means for releasing loop 652 from around neck 52 is operatively arranged to actuate when absorbent cloth 620 is pulled in a direction away from the user's neck 52, similar to that which is shown in FIG. 5 and described in detail supra.

Absorbent cloth 620 may comprise any suitable absorbent cloth. As shown in the figures, absorbent cloth 620 includes front surface 619 and may be substantially rectangular. If rectangular, absorbent cloth 620 generally comprises first upper corner region 623, second upper corner region 627, a first lower corner region (not shown), and a second lower corner region (not shown). In a preferred embodiment, first and/or second upper corner regions, 623 and/or 627, respectively, comprises hood 630. Hood 630 is operatively arranged to cover head 32 of infant 30. Absorbent cloth 620 is adapted to substantially cover and/or shield the front of the user's torso 54 when it is arranged hangingly from collar 650. This hanging arrangement also allows user 50 to keep both of her hands free while she is bathing infant 30.

Loop 652 comprises first strap 655 extending from absorbent cloth 620, first strap 655 having first end 657, and second strap 656 extending from absorbent cloth 620, second strap 656 having second end 658. First end 657 and second end 658 are releasably securable to each other.

In this embodiment, the actuatable means for releasing loop 652 from around the user's neck 52 comprises means 699 for releasably securing first end 657 to second end 658. Means 659 may be any suitable means in the art, such as, a first magnet fixedly secured to first end 657 and a second magnet fixedly secured to second end 658, wherein the first magnet and the second magnets are magnetically attracted to each other. Alternatively, means 659 may comprise hookand-loop fasteners, of which first end 657 comprises a hook side and second end 658 comprises a loop side.

It is contemplated that the present invention bath towel bib would be well-suited for use in bathing an animal, such as, a dog. To that end, the bath towel bib may include means for fastening the absorbent cloth around an animal. For example, bath towel bib 600 is shown comprising third magnet 601 and fourth magnet 603, wherein third magnet 601 and fourth magnet 603 are magnetically attracted to each other. In such an embodiment, absorbent cloth 620 may be adapted to circumscribe the body of a four-legged animal, and the user could secure the cloth to the animal's body by attaching magnets 601 and 603 to each other. Additionally, first strap 655 and second strap 656 may be adapted to fit around and secure to the animal's neck.

Figure 11:
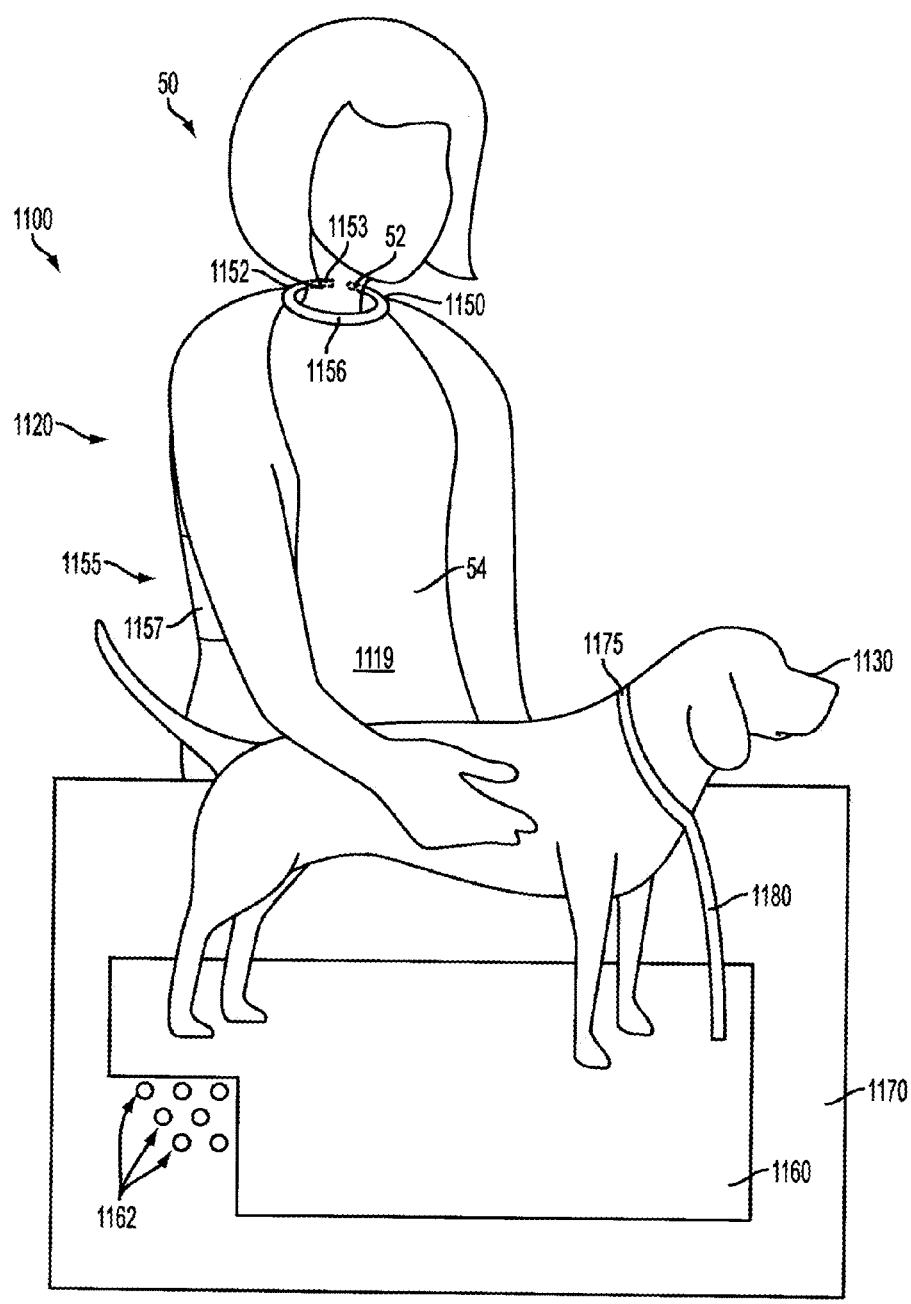
FIG. 11 is a front perspective view of a user displaying a seventh embodiment of the present invention bath towel bib while bathing a pet.

FIG. 11 is a front perspective view of user 50 displaying a seventh embodiment of the present invention bath towel bib, hereinafter referred to as bath towel bib 1100, for use in bathing a pet. Similar to bath towel bib 500, bath towel bib 1100 comprises collar 1150 adapted to form releasably securable loop 1152 around the user's neck 52, an actuatable means for releasing loop 1152 from around the user's neck 52, and absorbent cloth 1120 fixedly attached to collar 1150. Absorbent cloth 1120 is operatively arranged to hang from collar 1150 in front of the user's torso 54 when loop 1152 is releasably secured around the user's neck 52. The actuatable means for releasing loop 1152 from around neck 52 is operatively arranged to actuate when absorbent cloth 1120 is pulled in a direction away from the user's neck 52, similar to that which is shown in FIG. 9 and described in detail supra.

Absorbent cloth 1120 may comprise any suitable absorbent cloth. As shown in the figures, absorbent cloth 1120 includes front surface 1119 and may be substantially rectangular. If rectangular, absorbent cloth 1120 generally comprises first upper corner region, second upper corner region, a first lower corner region, and a second lower corner region. Absorbent cloth 1120 is adapted to substantially cover and/or shield the front of the user's torso 54 when it is arranged hangingly from collar 1150. This hanging arrangement also allows user 50 to keep both of her hands free while she is bathing pet 1130. Absorbent cloth 1120 may comprise an absorbent material on the side of the absorbent cloth facing the pet and a substantially waterproof material on the opposite side of the absorbent cloth. Absorbent cloth 1120 may comprise a plurality of layers including an absorbent material on one side and a substantially waterproof material on the other side.

Figure 12:
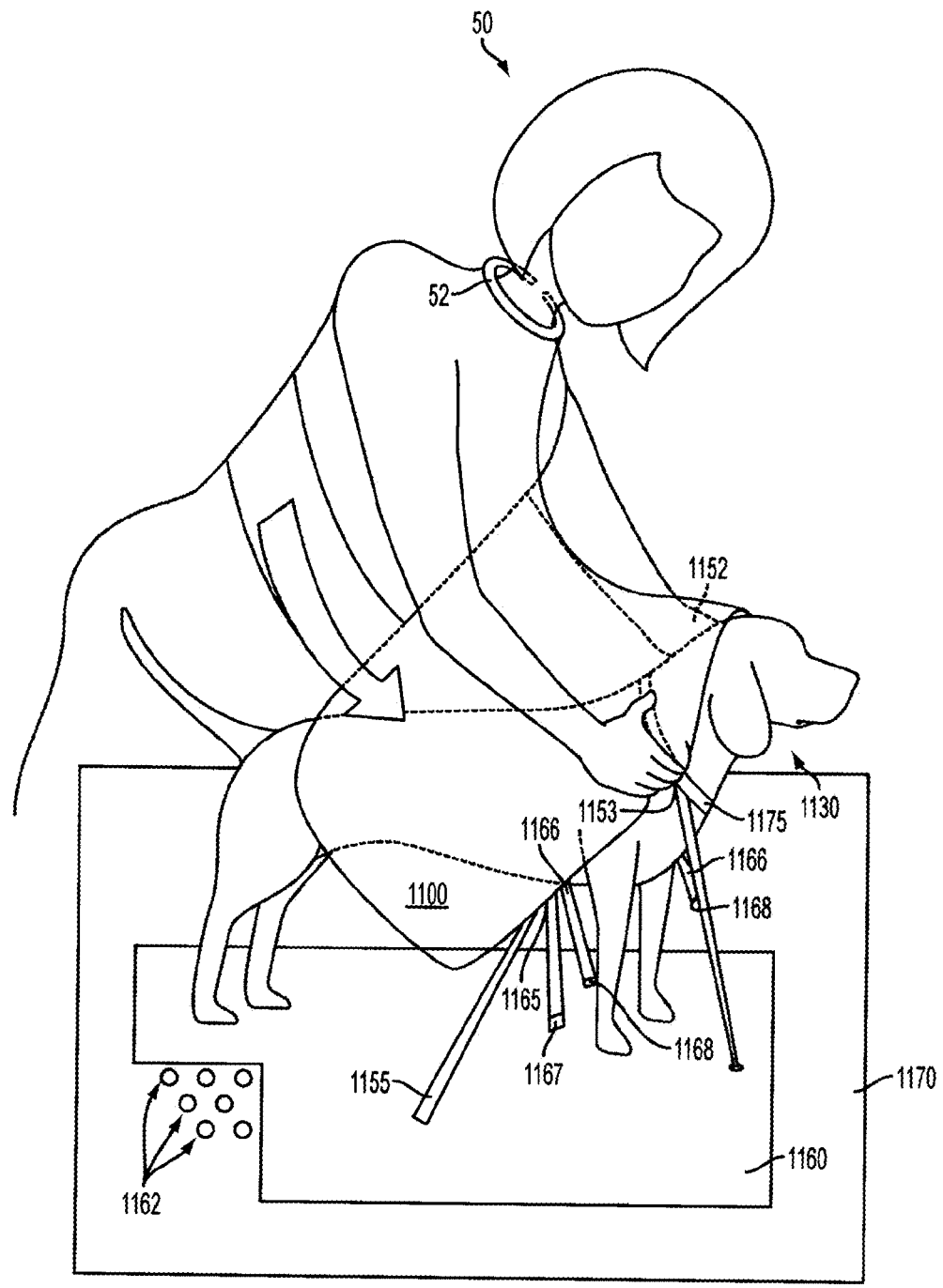
FIG. 12 is a front perspective view of a user utilizing the bath towel bib of FIG. 11 in conjunction with a bath mat, showing the user covering the wet pet with the bath towel bib.
Figure 13:
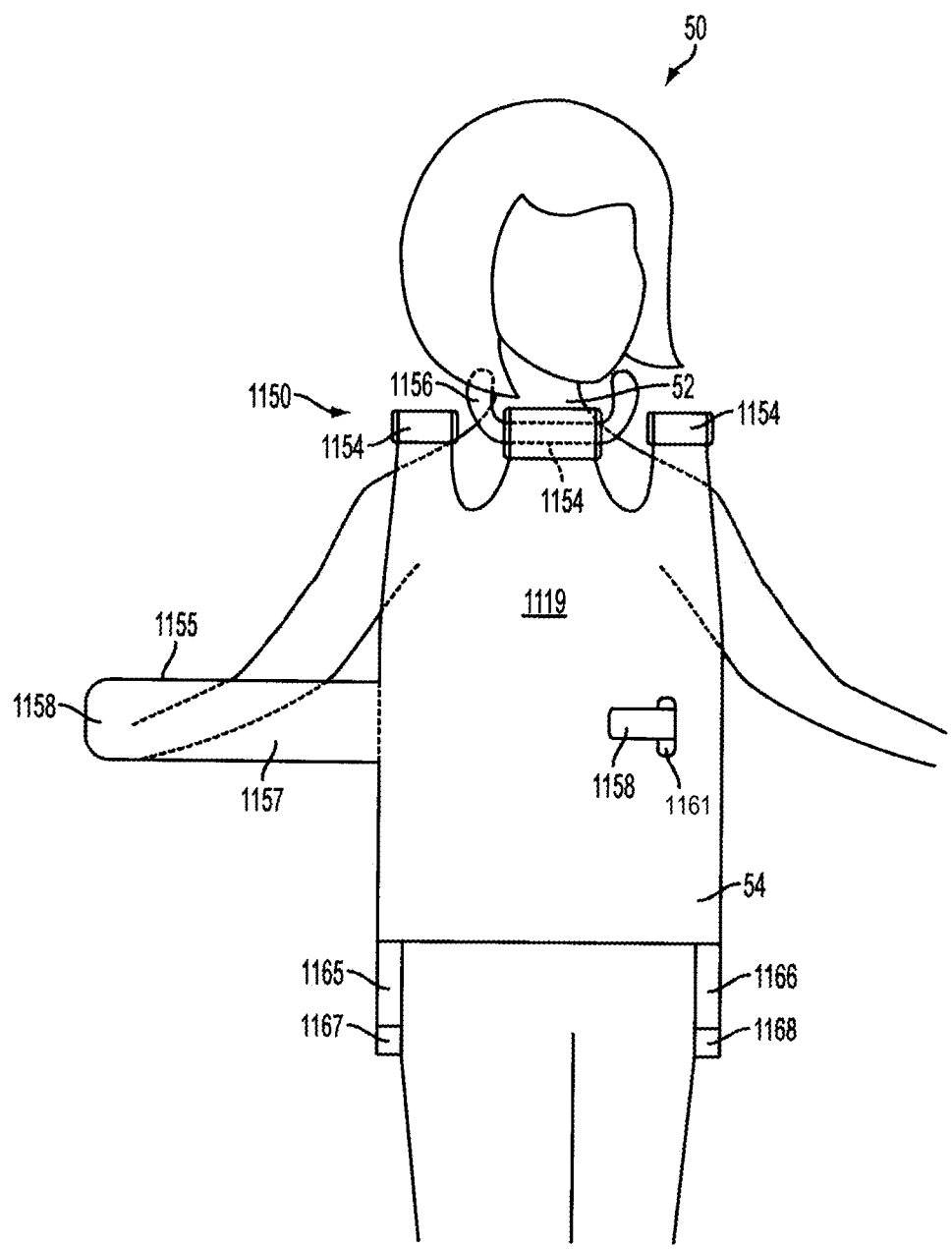
FIG. 13 is a front perspective view of an alternative embodiment of the seventh embodiment of the invention.

Bath towel bib 1100 further comprises first strap 1155 extending from absorbent cloth 1120 proximate a first side of the user's torso 54. First strap 1155 may be an extension of the material from which absorbent cloth 1120 is made, or a separate piece of material fixedly secured to such material. Bath towel bib 1100 further comprises aperture 1160 1161, as seen in FIG. 13, in absorbent cloth 1120. First strap 1155 comprises first end 1158, as seen in FIG. 13, and outer surface 1157. First end 1158 is insertable in aperture 1161. While aperture 1161 may be arranged anywhere on bath towel bib 1100 within reach of first end 1158, in this embodiment, aperture 1160 1161 is arranged on absorbent cloth 1120 proximate the opposite side of the user's torso 54 of first strap 1155, and first strap 1155 is of sufficient length to extend behind the user's back to reach aperture 1161. In this embodiment, first strap 1155 forms a frictional engagement between outer surface 1157 and inner surface of bath towel 1100 when first end 1158 is arranged in the aperture sufficient to maintain the bath towel 1100 around the user's torso 54, but insufficient to maintain the bath towel 1100 around user's torso 54 when absorbent cloth 1120 is pulled in a direction away from the user's neck 52, as shown in FIG. 12. In one embodiment, as shown in the figures, first end 1158 is larger than aperture 1161

Bath towel bib 1100 further comprises second strap 1165 extending from absorbent cloth 1120, second strap 1165 having second end 1167, and third strap 1166 extending from absorbent cloth 1120, third strap 1166 having third end 1168, as seen in FIG. 12. Second end 1167 and third end 1168 may be formed by rolling the end of second strap 1165 and third strap 1166 over and stitching the edge of each end to its back or front side. Second strap 1165 and third strap 1168 can extend in front of or behind user's torso 54 while bath towel bib 1100 is worn by the user 50. In one embodiment, second strap 1165 and third strap 1166 are extensions of absorbent cloth 1120 substantially in the area of the torso 54 of the user 50. Alternatively, second strap 1165 and third strap 1166 may comprise extensions attached to absorbent cloth 1120, and in one embodiment may be attached to absorbent cloth 1120 substantially in the area of the torso 54 of the user 50.

Second end 1167 and third end 1168 comprise means for releasably attaching to loop 1152. Means for releasably attaching second end 1167 and third end 1168 to loop 1152 may comprise sliding second end 1167 and third end 1168 over loop 1152. In one embodiment, means for releasably attaching second end 1167 and third end 1168 may comprise magnets placed on second end 1167 and third end 1168 and second strap 1165 and third strap 1166 such that second end 1167 and third end 1168 may be folded over loop 1152 and hooked to second strap 1165 and third strap 1166 by way of magnetic attraction. In another embodiment, means for releasably attaching second end 1167 and third end 1168 may comprise hook and loop fasteners placed on second end 1167 and third end 1168 and second strap 1165 and third strap 1166 such that second end 1167 and third end 1168 may be folded over loop 1152 and hooked to second strap 1165 and third strap 1166 by way of the hook and loop fasteners.

Loop 1152 loop is in the form of C-shaped band 1156, which comprises an elastic material. Hereinafter, a material is considered to be elastic if it deforms under stress (e.g., external forces), but returns to its original shape when the stress is removed. Band 1156 extends from absorbent cloth 1120 and is adapted to substantially surround the user's neck 52. In one embodiment, band 1156 is at least partially encased in semi-toroidal cloth, which serves as a means for securing band 1156 to absorbent cloth 1120, and provides soft engagement between the user's neck 52 and collar 1150. Band 1156 may also be encased in a plurality of semi-toroidal cloth pieces 1154 formed from or attached to absorbent cloth 1120, as seen in FIG. 13. Loop 1152 may further comprise a securement mechanism 1153. Securement mechanism 1153 may be formed by folding over the two ends of loop 1152 to form a U-shaped hook such that the one end of loop 1152 may be inserted into the other end of loop 1152 to secure loop 1152.

In this embodiment, the actuatable means for releasing loop 1152 from around the user's neck 52 comprises the elasticity of the material band 1156, wherein the elasticity is sufficient to maintain the form of loop 1152 when absorbent cloth 1120 hangs from collar 1150 in front of the user's torso 54, but insufficient to maintain the form of loop 1152 when absorbent cloth 1120 is pulled in a direction away from the user's neck 52. Accordingly, band 1156 may comprise any suitable elastic material, such as, plastic, rubber, etc.

Bath mat 1160 can also be used in conjunction with bath towel bib 1100 for use in restraining pet 1130 during the bath. Bath mat 1160 may comprise a plurality of suction cups 1162 to secure bath mat 1160 to the bathing surface 1170. Bath mat 1160 may further comprise a collar 1175 connected to bath mat 1160 via adjustable straps 1180 (see also FIG. 16e).

Bath towel bib 1100 is used substantially as follows. In the first step, as seen in FIG. 11, user 50 has collar 1150 forming loop 1152, releasably secured around her neck 52, from which absorbent cloth 1120 hangs in front of her torso 54, shielding her from the bath water. In this figure, user 50 is bathing pet 1130 in a bath. In this embodiment, loop 1152 is not secured around user's neck 52 by securement mechanism 1153.

The second step is illustrated in FIG. 12, wherein user 50 pulls absorbent cloth 1120 in a direction away from her neck 52, as indicated by the arrow pointing away from her neck. As described supra, the actuatable means for releasing loop 1152 from around the user's neck 52 comprises the elasticity of the material band 1156, wherein the elasticity is sufficient to maintain the form of loop 1152 when absorbent cloth 1120 hangs from collar 1150 in front of the user's torso 54, but insufficient to maintain the form of loop 1152 when absorbent cloth 1120 is pulled in a direction away from the user's neck 52. The force to release loop 1152 from user's neck 52 is also sufficient to overcome the static friction of the frictional engagement between first end 1158 and aperture 1161, thereby releasing the user's torso 54 from first strap 1155.

Figure 16A:
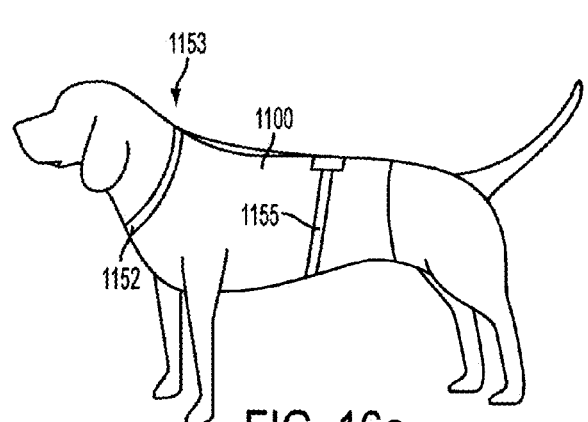
FIG. 16a is a left perspective view of the seventh embodiment of the invention covering a wet pet.
Figure 16B:
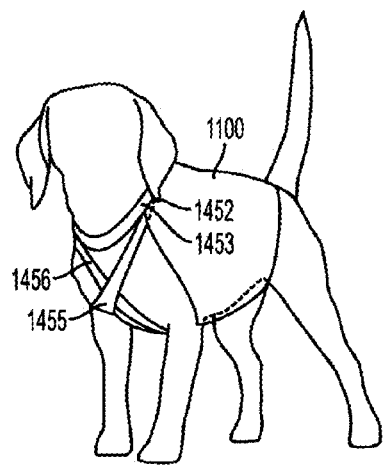
FIG. 16b is a left perspective view of the eighth embodiment of the invention covering a wet pet.
Figure 16C:
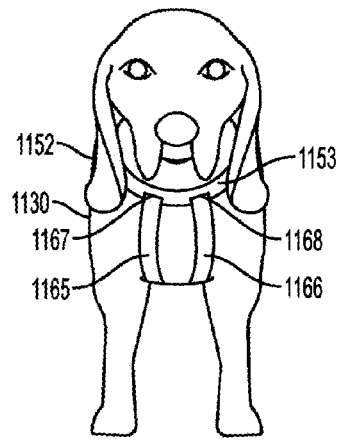
FIG. 16c is a front perspective view of a wet pet covered with the seventh embodiment of the invention.

When the entirety of bath towel bib 1100 is pulled away from user 50, bath towel bib 1100 is wrapped around wet pet 1130. As seen in FIGS. 16a and 16c, loop 1152 is placed around the neck of pet 1130. The elasticity of loop 1152 is preferably sufficient to maintain the form of loop 1152 when placed around the neck of pet 1130. In this embodiment, loop 1152 is secured around the neck of pet 1130 by way of securement mechanism 1153 wherein one end of loop 1152 may be inserted into the other end of loop 1152 to secure loop 1152 around the neck of pet 1130. Bath towel bib 1100 is placed around the torso of pet 1130 and secured by first strap 1155. First strap 1155 may be secured by the frictional engagement formed by placing first end 1158 through aperture 1161 once placed on the body of pet 1130. In another embodiment, bath towel bib 1100 may further comprise any suitable means in the art to attach first strap 1155 to bath towel bib 1100 when placed around the torso of pet 1130, such as a first magnet fixedly secured to first end 1158 and a second magnet fixedly secured to absorbent cloth 1120, wherein the first magnet and the second magnets are magnetically attracted to each other. Alternatively, attachment means may comprise hook-and-loop fasteners, of which first end 1158 comprises a hook side and absorbent cloth 1120 comprises a loop side.

Further, second strap 1165 and third strap 1166 are of sufficient length such that they can be extended in front of the pet's chest when bath towel bib 1100 is placed around the torso of pet 1130. Second end 1167 and third end 1168 can be releasably attached to loop 1152 by any suitable means in the art. Means for releasably attaching second end 1167 and third end 1168 to loop 1152 may comprise sliding second end 1167 and third end 1168 over loop 1152. In one embodiment, means for releasably attaching second end 1167 and third end 1168 may comprise magnets placed on second end 1167 and third end 1168 and second strap 1165 and third strap 1166 such that second end 1167 and third end 1168 may be folded over loop 1152 and hooked to second strap 1165 and third strap 1166 by way of the magnets. In another embodiment, means for releasably attaching second end 1167 and third end 1168 may comprise hook and loop fasteners placed on second end 1167 and third end 1168 and second strap 1165 and third strap 1166 such that second end 1167 and third end 1168 may be folded over loop 1152 and hooked to second strap 1165 and third strap 1166 by way of the hook and loop fasteners. Securing bath towel bib 1100 to pet 1130 makes it less likely that pet 1130 can get out of bath towel bib 1100 and thus reducing the possibility that pet 1130 will shake excess water onto its surroundings.

Once bath towel bib 1100 has been placed around wet pet 1130, pet 1130 may be released from being tethered to bath mat 1160 by removing collar 1175 from pet 1130.

Figure 14A:
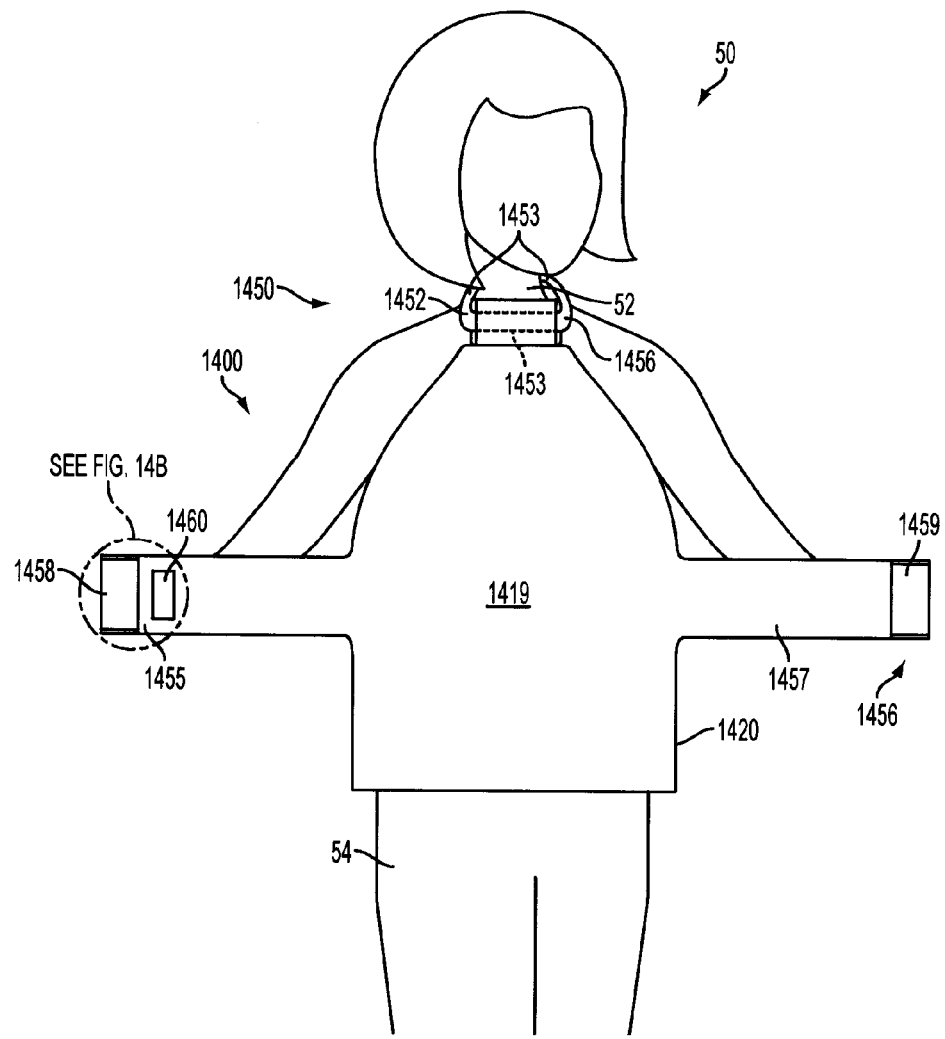
FIG. 14A is a front perspective view of an eighth embodiment of the invention.

FIG. 14A is a front perspective view of user 50 displaying an eighth embodiment of the present invention bath towel bib, hereinafter referred to as bath towel bib 1400, for use in bathing a pet. Similar to bath towel bib 1100, bath towel bib 1400 comprises collar 1450 adapted to form releasably securable loop 1452 around the user's neck 52, an actuatable means for releasing loop 1452 from around the user's neck 52, and absorbent cloth 1420 fixedly attached to collar 1450. Absorbent cloth 1420 is operatively arranged to hang from collar 1450 in front of the user's torso 54 when loop 1452 is releasably secured around the user's neck 52. The actuatable means for releasing loop 1452 from around neck 52 is operatively arranged to actuate when absorbent cloth 1420 is pulled in a direction away from the user's neck 52, similar to that which is shown in FIGS. 11, 12 and 13 and described in detail supra.

Absorbent cloth 1420 may comprise any suitable absorbent cloth. As shown in the figures, absorbent cloth 1420 includes front surface 1419 and may be substantially rectangular. If rectangular, absorbent cloth 1420 generally comprises first upper corner region, second upper corner region, a first lower corner region, and a second lower corner region. Absorbent cloth 1420 is adapted to substantially cover and/or shield the front of the user's torso 54 when it is arranged hangingly from collar 1450. This hanging arrangement also allows user 50 to keep both of her hands free while she is bathing a pet (not shown). Absorbent cloth 1420 may comprise an absorbent material on the side of the absorbent cloth facing the pet and a substantially waterproof material on the opposite side of the absorbent cloth. Absorbent cloth 1420 may comprise a plurality of layers including an absorbent material on one side and a substantially waterproof material on the other side.

Figure 14B:
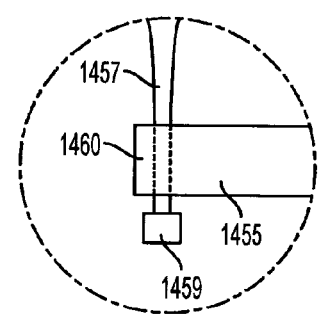
FIG. 14B is a front perspective view of insertion of FIG. 14B is a front perspective view of insertion of the end of an outer surface of a strap into the aperture of a strap of FIG. 14A.

Bath towel bib 1400 further comprises fourth strap 1455 extending from absorbent cloth 1420 proximate a first side of the user's torso 54 and fifth strap 1456 proximate the opposite side of the user's torso 54. Fourth strap 1455 and fifth strap 1456 may be extensions of the material from which absorbent cloth 1420 is made, or separate pieces of material fixedly secured to such material. Fourth strap 1455 comprises fourth end 1458 formed by rolling the end of fourth strap 1455 over and stitching the edge of fourth strap 1455 to its back or front side, and further comprises an aperture 1460, as seen FIG. 14B. Fifth strap 1456 comprises fifth end 1459 formed by rolling the end of fifth strap 1456 over and stitching the edge of fifth strap 1456 to its back or front side, and further comprises and outer surface 1457. Fifth end 1459 is insertable in aperture 1460. Fourth 1455 and fifth strap 1456 are of sufficient length to meet behind the user's back. In this embodiment, fifth strap 1456 forms a frictional engagement between outer surface 1457 and inner surface of aperture 1460 when fifth end 1498 is arranged in aperture 1460 sufficient to maintain the bath towel bib 1400 around the user's torso 54, but insufficient to maintain the bath towel bib 1400 around user's torso 54 when absorbent cloth 1420 is pulled in a direction away from the user's torso. In one embodiment, as shown in the figures, fifth end 1459 is larger than aperture 1460.

Fourth end 1458 and fifth end 1459 further comprise means for releasably attaching to loop 1452. Means for releasably attaching fourth end 1458 and fifth end 1459 to loop 1452 may comprise sliding fourth end 1458 and fifth end 1459 over loop 1452. In one embodiment, means for releasably attaching fourth end 1458 and fifth end 1459 may comprise magnets placed on fourth end 1458 and fifth end 1459 and fourth strap 1455 and fifth strap 1456 such that fourth end 1458 and fifth end 1459 may be folded over loop 1452 and hooked to fourth strap 1455 and fifth strap 1456 by way of magnetic attraction. In another embodiment, means for releasably attaching fourth end 1458 and fifth end 1459 may comprise hook and loop fasteners placed on fourth end 1458 and fifth end 1459 and fourth strap 1455 and fifth strap 1456 such that fourth end 1458 and fifth end 1459 may be folded over loop 1452 and hooked to fourth strap 1455 and fifth strap 1456 by way of the hook and loop fasteners.

Loop 1452 loop is in the form of C-shaped band 1456, which comprises an elastic material. Hereinafter, a material is considered to be elastic if it deforms under stress (e.g., external forces), but returns to its original shape when the stress is removed. Band 1456 extends from absorbent cloth 1420 and is adapted to substantially surround the user's neck 52. In one embodiment, band 1456 is at least partially encased in semi-toroidal cloth, which serves as a means for securing band 1456 to absorbent cloth 1420, and provides soft engagement between the user's neck 52 and collar 1450. Band 1456 may also be encased in one or more semi-toroidal cloth pieces 1453 formed from or attached to absorbent cloth 1420. Loop 1452 may further comprise securement mechanism 1453. Securement mechanism 1453 may be formed by folding over the two ends of loop 1452 to form a U-shaped hook such that the one end of loop 1452 may be inserted into the other end of loop 1452 to secure loop 1452.

In this embodiment, as in the seventh embodiment described in relation to FIGS. 11, 12 and 13, the actuatable means for releasing loop 1452 from around the user's neck 52 comprises the elasticity of the material band 1456, wherein the elasticity is sufficient to maintain the form of loop 1452 when absorbent cloth 1420 hangs from collar 1450 in front of the user's torso 54, but insufficient to maintain the form of loop 1452 when absorbent cloth 1420 is pulled in a direction away from the user's neck 52. Accordingly, band 1456 may comprise any suitable elastic material, such as, plastic, rubber, etc.

Bath mat 1160 can also be used in conjunction with bath towel bib 1400 for use in restraining pet 1130 during the bath as described in the seventh embodiment in relation to FIGS. 11, 12 and 13.

Bath towel bib 1100 is used substantially as described for the seventh embodiment in relation to FIGS. 11 and 12. In this eighth embodiment, the force to release loop 1452 from user's neck 52 is sufficient to also overcome the static friction of the frictional engagement between fifth end 1459 and aperture 1460, thereby releasing the user's torso 54 from fourth strap 1455 and fifth strap 1456.

Figure 15:
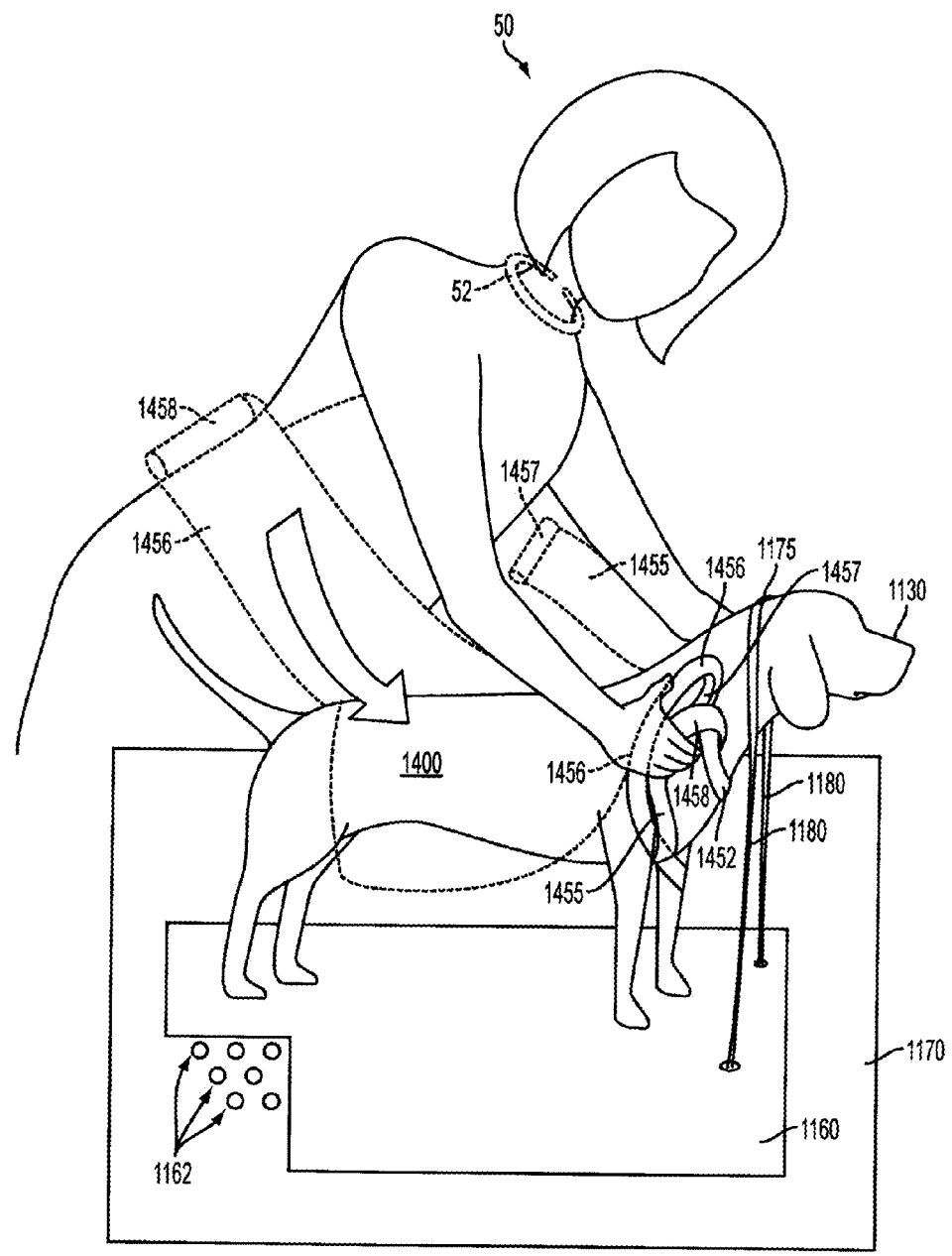
FIG. 15 is a front perspective view of a user utilizing the bath towel bib of FIG. 14A showing the user covering a wet pet.
Figure 16D:
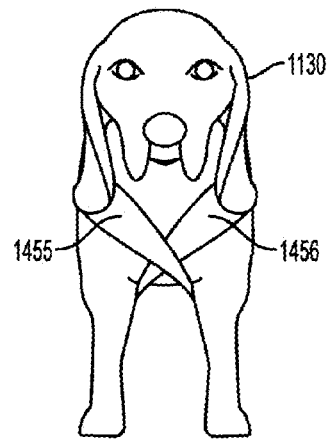
FIG. 16d is a front perspective view of a wet pet covered with the eighth embodiment of the invention.
Figure 16E:
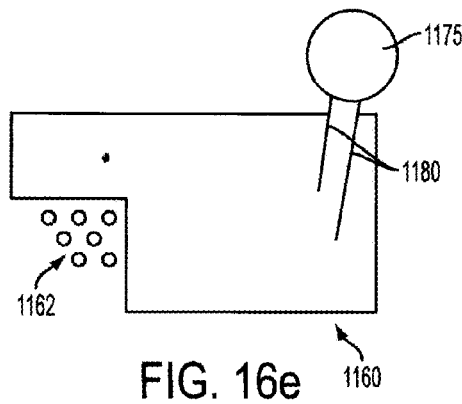
FIG. 16e is a top perspective view of a mat used in conjunction with the seventh and eighth embodiments of the invention for use in bathing a pet.

As seen in FIG. 15, when the entirety of bath towel bib 1400 is pulled away from user 50, bath towel bib 1400 is wrapped around wet pet 1130. As seen in FIGS. 16b and 16d, loop 1452 is placed around the neck of pet 1130. The elasticity of loop 1452 is preferably sufficient to maintain the form of loop 1452 when placed around the neck of pet 1130. In this embodiment, loop 1452 is secured around the neck of pet 1130 by way of securement mechanism 1453 wherein one end of loop 1452 may be inserted into the other end of loop 1452 to secure loop 1452 around the neck of pet 1130. Bath towel bib 1400 is placed around the torso of pet 1130 and secured.

In one embodiment, fourth strap 1455 and fifth strap 1456 are of sufficient length such that they can be extended in front of the pet's chest when bath towel bib 1100 is placed around the torso of pet 1130. Fourth end 1458 and fifth end 1459 can be releasably attached to loop 1452 by any suitable means in the art. Means for releasably attaching fourth end 1458 and fifth end 1459 to loop 1452 may comprise sliding fourth end 1458 and fifth end 1459 over loop 1452. In one embodiment, means for releasably attaching fourth end 1458 and fifth end 1459 may comprise magnets placed on fourth end 1458 and fifth end 1459 and fourth strap 1455 and fifth strap 1456 such that fourth end 1458 and fifth end 1459 may be folded over loop 1452 and hooked to fourth strap 1455 and fifth strap 1456 by way of magnetic attraction. In another embodiment, means for releasably attaching fourth end 1458 and fifth end 1459 may comprise hook and loop fasteners placed on fourth end 1458 and fifth end 1459 and fourth strap 1455 and fifth strap 1456 such that fourth end 1458 and fifth end 1459 may be folded over loop 1452 and hooked to fourth strap 1455 and fifth strap 1456 by way of the hook and loop fasteners. Securing bath towel bib 1100 to pet 1130 makes it less likely that pet 1130 can get out of bath towel bib 1100 and thus reducing the possibility that pet 1130 will shake excess water onto its surroundings. Once bath towel bib 1400 has been placed around wet pet 1130, pet 1130 may be released from being tethered to bath mat 1160 by removing collar 1175 from pet 1130.

In one embodiment of the invention, the bath towel bib comprises a built-in tote bag that allows the user to easily fold and carry the bath towel bib. The tote bag comprises two panels, a front panel and back panel, attached at a bottom seam, a right side seam and a left side seam, to form an interior first cavity accessible through an opening at the top of the tote bag. The tote bag further comprise two cords, one cord attached to each side seam, through which a user can place her arms so that the tote bag can be carried on her back in the nature of a backpack. The tote bag is attached to the bath towel bib at each side seam and the bottom seam, thus forming a second cavity between the back panel of the tote bag and the bath towel bib with the back panel facing the bath towel bib. The cord(s) may be threaded through a channel sewn into the top edge of the tote bag at the opening such that the top edge of the tote bag may be substantially closed at the opening by gathering the top edge of the tote bag along the threaded cord(s).

To fold the bath towel bib after use and carry it along with the tote bag, first the orientation of the tote bag and bath towel bib are reversed such that the back panel of the tote bag faces outward away from the bath towel bib and the front panel of the tote bag faces toward the bath towel bib, forming a third cavity between the front panel of the tote bag and the bath towel bib. The bath towel bib is then folded to fit inside the third cavity.

When the user wants to use the bath towel bib, she removes the bath towel bib from the third cavity, reverses the orientation of the tote bag and the bath towel bib so that the front panel of the tote bag faces away from the bath towel bib and the back panel of the tote bag faces toward the bath towel bib, and uses the bath towel bib as elsewhere described herein. The tote bag can provide a waterproof panel for the wearer when worn as a bath towel bib.

The inner first cavity of the tote bag may be lined, and the lining may comprise a water-proof or water-resistant material if desired. The outer surfaces of the front and back panels of the tote bag may comprise water-resistant or water-proof materials. The inner first cavity of the tote bag may be provided with additional pockets or loops for securing items, if desired.

Figure 17A:
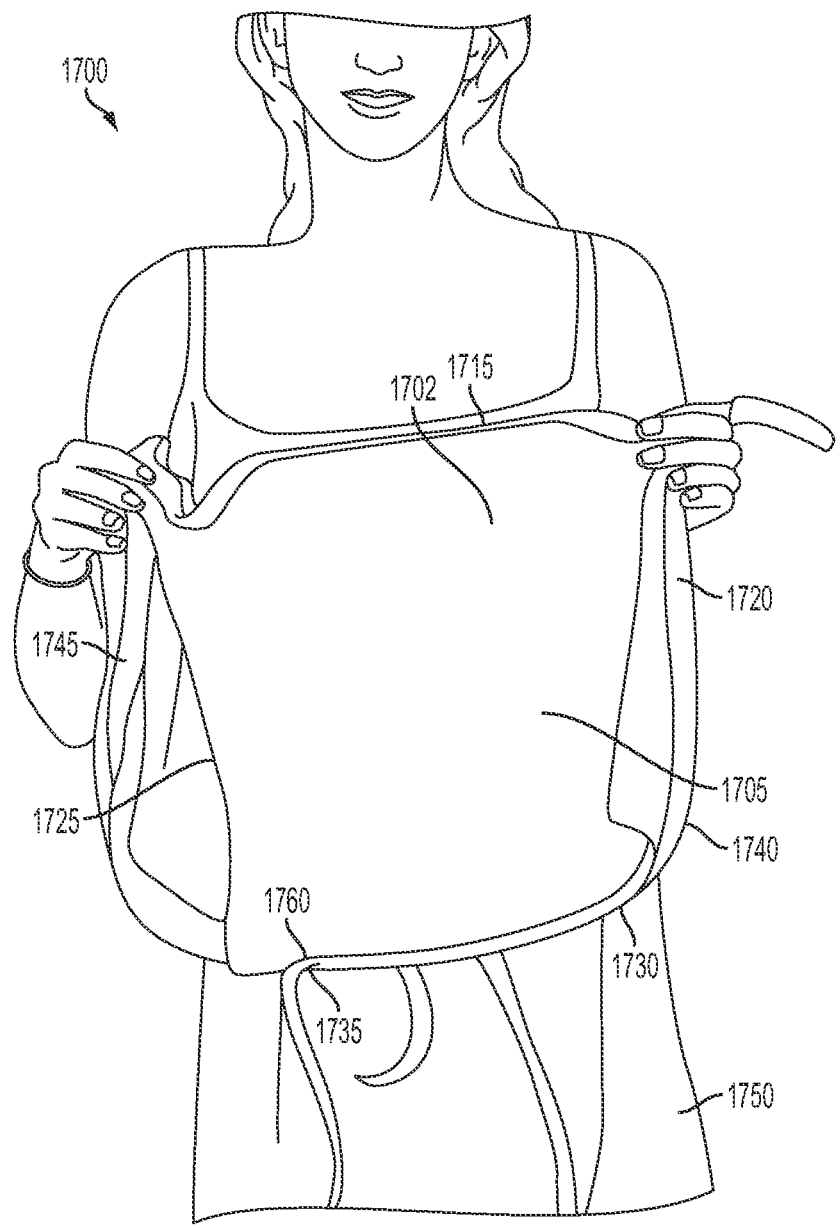
FIG. 17a is a front view of a bath towel bib with built-in tote bag in its open position.

In a front view of one embodiment of the invention as seen in FIG. 17a, a bath towel bib with built-in tote bag 1700 is shown. Tote bag 1702 comprises two panels, a front panel 1705 and back panel (not seen in this view) which are attached at a bottom seam 1715, a right side seam 1720 and a left side seam 1725 to form an inner first cavity 1730 accessible through an opening 1735 at the top of the tote bag 1702. Tote bag 1702 further comprise two cords 1740 and 1745, one attached to each side seam 1720 and 1725. Tote bag 1702 is attached to a bath towel bib 1750 at each side seam 1720 and 1725 and the bottom seam 1715, thus forming a second cavity (not seen in this view) between the back panel of tote bag 1700 and bath towel bib 1750 with the back panel (not shown) facing the bath towel bib 1750.

Figure 17B:
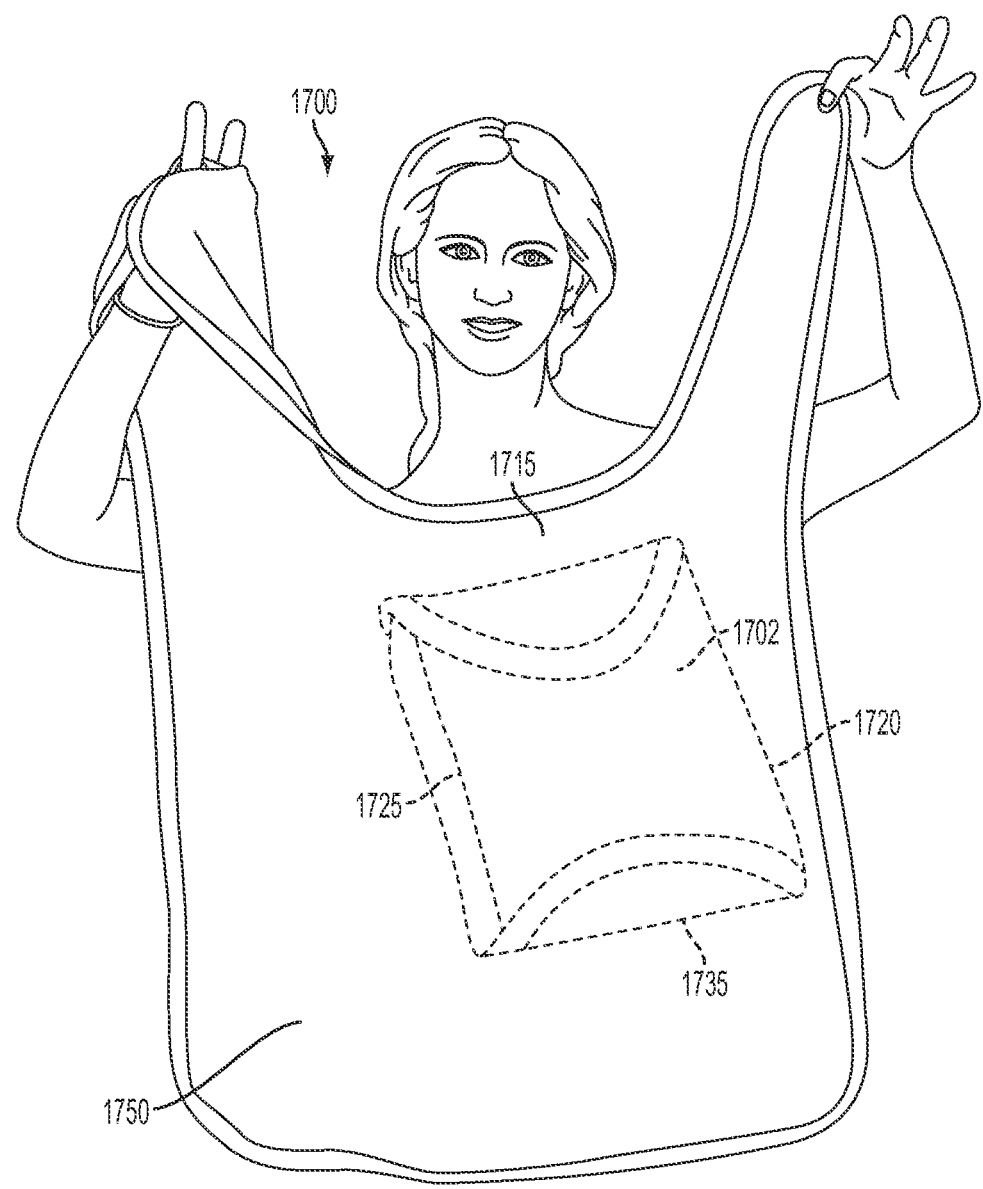

FIG. 17b depicts a back view of bath towel bib 1750 of FIG. 17a showing tote bag 1702 disposed on bath towel bib 1750.

Figure 17C:
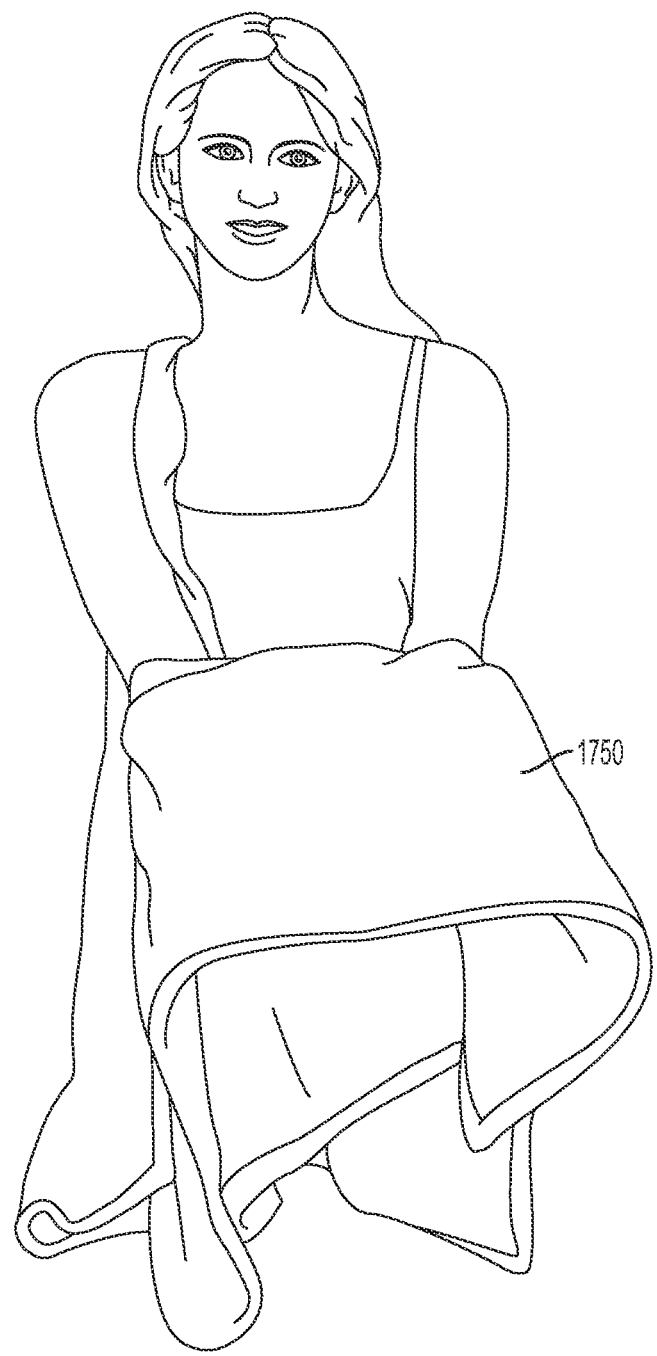
FIG. 17c is a front view of the bath towel bib with built-in tote bag of FIG. 17a in the process of folding the bath towel bib for easy carrying.

FIG. 17c depicts the step of reversing the orientation of tote bag 1702 and bath towel bib 1750 such that front panel 1705 of tote bag 1702 faces away from bath towel bib 1750 and back panel 1710 of tote bag 1702 faces toward bath towel bib 1750, forming a third cavity (not seen) between front panel 1705 of tote bag 1702 and bath towel bib 1750. Bath towel bib 1750 is then folded to fit inside the third cavity.

Figure 17D:
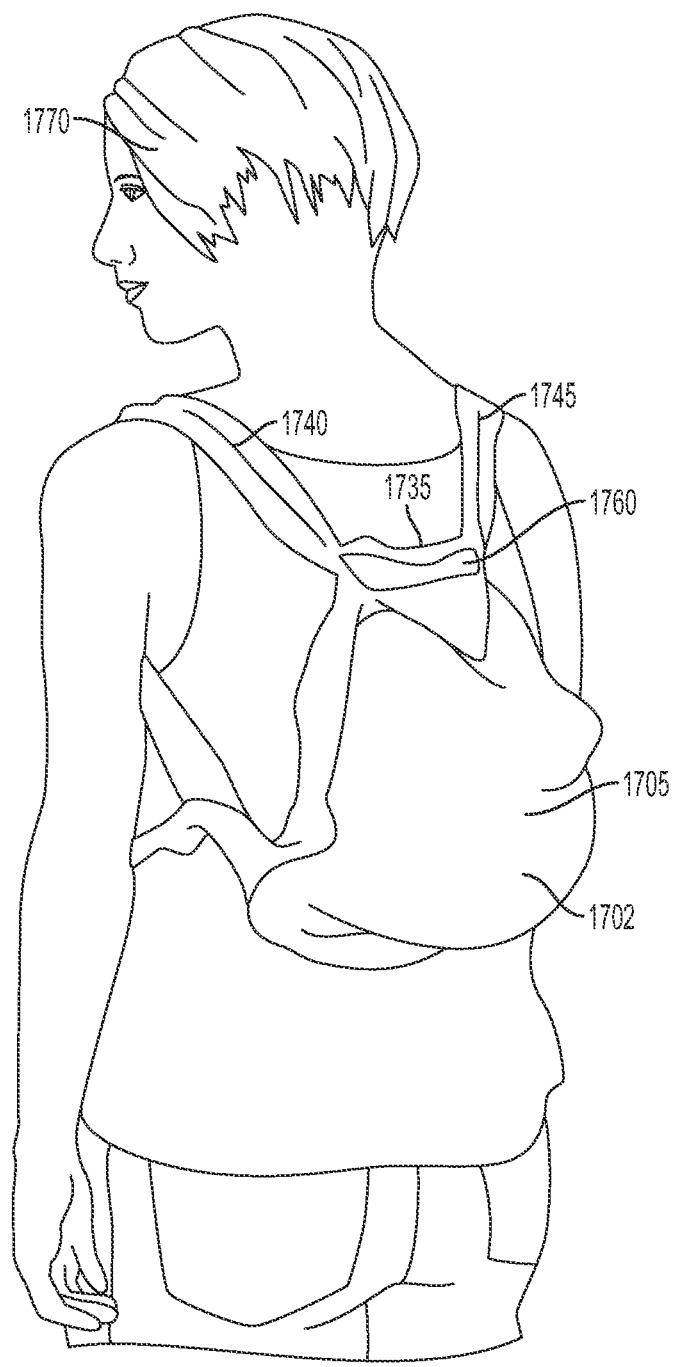
FIG. 17d is a back perspective view of the bath towel bib with built-in tote bag of FIG. 17a folded and packed with the built-in tote bag for easy carrying as a backpack.

FIG. 17d depicts tote bag 1702 as worn by a user with her arms placed through the loops formed by cords 1740 and 1745. Cord(s) 1740 and 1745 may be threaded through a channel 1760 sewn into opening 1735 of tote bag 1702 such that opening 1735 of tote bag 1702 may be substantially closed by gathering it along the threaded cord(s) 1740 and 1745.

In one embodiment, bath towel bib 1750 can be constructed and used as previously described with regard to FIGS. 1-16. In one embodiment, bath towel bib 1750 can be secured around a user's neck by way of a releasable securable loop, which loop can be released by actuatable means that comprises fastening mechanisms such as snaps, hook and eye fasteners, hook and loop fasteners, magnets, buttons and any other fastening mechanism now known or later developed.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A bath towel bib with built-in tote bag comprising:
   a tote bag comprising a front panel and a back panel, wherein the front panel and the back panel are mated at a bottom seam, a right side seam and a left side seam to form an inner first cavity, wherein the inner first cavity is accessible through an opening at the top of the tote bag, wherein the tote bag further comprises a first cord and a second cord, wherein the first cord is attached to the tote bag at the right side seam and the second cord is attached to the tote bag at the left side seam; and
   a bath towel bib, wherein the bath towel bib comprises:
      a collar adapted to form a releasably securable loop around a user's neck;
      an actuatable means for releasing the loop from around the user's neck;
      an absorbent cloth fixedly attached to the collar and operatively arranged to hang from the collar in front of the user's torso when the loop is releasably secured around the user's neck,
      wherein the tote bag is mated to the bath towel bib at the right side seam and the left side seam of the tote bag to form a second cavity between the back panel of the tote bag and the bath towel bib.

2. The bath towel bib with built-in tote bag of claim 1, wherein the actuatable means for releasing the loop from around the user's neck is operatively arranged to actuate when the absorbent cloth is pulled in a direction away from the user's neck.

3. The bath towel bib with built-in tote bag of claim 2, wherein the bath towel bib further comprises a first aperture having a first inner surface, wherein the loop comprises a first strap extending from the absorbent cloth proximate a first side of the user's neck, the first strap having a first end and an outer surface, the first end is insertable in the first aperture, and the actuatable means for releasing the loop from around the user's neck comprises a frictional engagement between the outer surface and the first inner surface when the first end is arranged in the first aperture, wherein the frictional engagement comprises a static friction sufficient to maintain the form of the loop when the absorbent cloth hangs from the collar in front of the user's torso, but insufficient to maintain the form of the loop when the absorbent cloth is pulled in a direction away from the user's neck, wherein the first end of the first strap is larger than the first aperture, wherein the first aperture comprises at least one portion of the bath towel bib folded over and secured to the absorbent cloth.

4. The bath towel bib with built-in tote bag of claim 3 wherein the absorbent cloth comprises a first corner region comprising a hood.

5. The bath towel bib with built-in tote bag of claim 2, wherein the collar of the bath towel bib further comprises a first strap having a first end and an outer surface, wherein the first strap extends from the absorbent material proximate a first side of the user's neck, wherein the bath towel bib further comprises a first aperture having a first inner surface, wherein the first end is insertable in the first aperture, and a first frictional engagement is formed between the outer surface and the first inner surface when the first end is arranged in the first aperture, and wherein the first frictional engagement comprises a static friction sufficient to maintain the form of the loop when the absorbent cloth hangs from the collar in front of the user's torso, but insufficient to maintain the form of the loop when the absorbent cloth is pulled in a direction away from the user's neck, and wherein the first end of the first strap is larger than the first aperture, wherein the first aperture is arranged on the absorbent cloth.

6. The bath towel bib with built-in tote bag of claim 5 wherein the absorbent cloth comprises a first corner region comprising a hood.

7. The bath towel bib with built-in tote bag of claim 1, wherein the front panel and back panel of the tote bag comprise a water-resistant material.

8. The bath towel bib with built-in tote bag of claim 1, wherein the actuatable means for releasing the loop of the bath towel bib from around the user's neck comprises a snap, a hook and eye fastener, a hook and loop fastener, a magnet, a button or any combination thereof.

9. A method of folding a bath towel bib for easy carrying along with a built-in tote bag comprising:
   providing a bath towel bib with built-in tote bag, comprising:
      a tote bag comprising a front panel and a back panel, wherein the front panel and the back panel are mated at a bottom seam, a right side seam and a left side seam to form an inner first cavity, wherein the inner first cavity is accessible through an opening at the top of the tote bag, wherein the tote bag further comprises a first cord and a second cord, wherein the first cord is attached to the tote bag at the right side seam and the second cord is attached to the tote bag at the left side seam; and
      a bath towel bib, wherein the bath towel bib comprises:
         a collar adapted to form a releasably securable loop around a user's neck;
         an actuatable means for releasing the loop from around the user's neck;
         an absorbent cloth fixedly attached to the collar and operatively arranged to hang from the collar in front of the user's torso when the loop is releasably secured around the user's neck,
   wherein the tote bag is mated to the bath towel bib at the right side seam and the left side seam of the tote bag wherein the back panel of the tote bag is facing the bath towel bib to form a second cavity between the back panel of the tote bag and the bath towel bib,
   reversing the orientation of the bath towel bib and the tote bag wherein the front panel of the tote bag is facing the bath towel bib to form a third cavity between the front panel of the tote bag and the bath towel bib,
   thereafter folding the bath towel bib, and
   inserting the folded bath towel bib inside the third cavity.

10. The method of claim 9, wherein the actuatable means for releasing the loop from around the user's neck is operatively arranged to actuate when the absorbent cloth is pulled in a direction away from the user's neck.

11. The method of claim 10, wherein the bath towel bib further comprises a first aperture having a first inner surface, wherein the loop comprises a first strap extending from the absorbent cloth proximate a first side of the user's neck, the first strap having a first end and an outer surface, the first end is insertable in the first aperture, and the actuatable means for releasing the loop from around the user's neck comprises a frictional engagement between the outer surface and the first inner surface when the first end is arranged in the first aperture, wherein the frictional engagement comprises a static friction sufficient to maintain the form of the loop when the absorbent cloth hangs from the collar in front of the user's torso, but insufficient to maintain the form of the loop when the absorbent cloth is pulled in a direction away from the user's neck, wherein the first end of the first strap is larger than the first aperture, wherein the first aperture comprises at least one portion of the bath towel bib folded over and secured to the absorbent cloth.

12. The method of claim 11 wherein the absorbent cloth comprises a first corner region comprising a hood.

13. The method of claim 10, wherein the collar of the bath towel bib further comprises a first strap having a first end and an outer surface, wherein the first strap extends from the absorbent material proximate a first side of the user's neck, wherein the bath towel bib further comprises a first aperture having a first inner surface, wherein the first end is insertable in the first aperture, and a first frictional engagement is formed between the outer surface and the first inner surface when the first end is arranged in the first aperture, and wherein the first frictional engagement comprises a static friction sufficient to maintain the form of the loop when the absorbent cloth hangs from the collar in front of the user's torso, but insufficient to maintain the form of the loop when the absorbent cloth is pulled in a direction away from the user's neck, and wherein the first end of the first strap is larger than the first aperture, wherein the first aperture is arranged on the absorbent cloth.

14. The method of claim 13 wherein the absorbent cloth comprises a first corner region comprising a hood.

15. The method of claim 9, wherein the front panel and back panel of the tote bag comprise a water-resistant material.

16. The method of claim 9, wherein the actuatable means for releasing the loop of the bath towel bib from around the user's neck comprises a snap, a hook and eye fastener, a hook and loop fastener, a magnet, a button or any combination thereof.

* * * * *